US010255456B2

(12) United States Patent
Guglani et al.

(10) Patent No.: US 10,255,456 B2
(45) Date of Patent: Apr. 9, 2019

(54) REMOTE SERVER ENCRYPTED DATA PROVISIONING SYSTEM AND METHODS

(71) Applicant: Visa International Service Association, San Francisco, CA (US)

(72) Inventors: Abhishek Guglani, San Mateo, CA (US); Sanjeev Sharma, Sunnyvale, CA (US); Jalpesh Chitalia, Sunnyvale, CA (US); Gerald Destremps, Pacifica, CA (US); Upendra Mardikar, San Jose, CA (US); Minghua Xu, Austin, TX (US); Jose Luis Rios Trevino, Austin, TX (US); Brijendra Singh, Cupertino, CA (US)

(73) Assignee: Visa International Service Association, San Francisco, CA (US)

(*) Notice: Subject to any disclaimer, the term of this patent is extended or adjusted under 35 U.S.C. 154(b) by 340 days.

(21) Appl. No.: 14/867,947

(22) Filed: Sep. 28, 2015

(65) Prior Publication Data
US 2016/0092696 A1 Mar. 31, 2016

Related U.S. Application Data

(60) Provisional application No. 62/107,966, filed on Jan. 26, 2015, provisional application No. 62/056,401, filed on Sep. 26, 2014.

(51) Int. Cl.
*G06F 21/62* (2013.01)
*H04L 29/06* (2006.01)
(Continued)

(52) U.S. Cl.
CPC ........ *G06F 21/6245* (2013.01); *G06F 21/335* (2013.01); *G06F 21/602* (2013.01);
(Continued)

(58) Field of Classification Search
None
See application file for complete search history.

(56) References Cited

U.S. PATENT DOCUMENTS 5,280,527 A 1/1994 Gullman
5,613,012 A 3/1997 Hoffman et al.
(Continued)

FOREIGN PATENT DOCUMENTS

EP 1028401 A2 8/2000
EP 2156397 A1 2/2010
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Amir Mehrmanesh
(74) *Attorney, Agent, or Firm* — Kilpatrick Townsend & Stockton LLP

(57) ABSTRACT

Embodiments of the invention are directed to methods, systems and devices for providing sensitive user data to a mobile device using an encryption key. For example, a mobile application on a mobile device may receive encrypted sensitive user data from a mobile application server, where the user sensitive data is encrypted with a key from a token server computer. The mobile application may then request that the encrypted payment information be sent to the token server. The mobile device may then receive a payment token associated with the payment information from the token server.

9 Claims, 23 Drawing Sheets

(51) Int. Cl.
*G06F 21/60* (2013.01)
*H04W 12/08* (2009.01)
*G06F 21/33* (2013.01)

(52) U.S. Cl.
CPC ........ *G06F 21/606* (2013.01); *H04L 63/0428* (2013.01); *H04W 12/08* (2013.01); *G06F 2221/2107* (2013.01); *H04L 2463/102* (2013.01)

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |

(56) References Cited

U.S. PATENT DOCUMENTS

| | | |
|---|---|---|
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,856,887 B2 | 10/2014 | Field-Eliot et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,397,980 B1 * | 7/2016 | Chen .................... H04L 9/3263 |
| 9,530,137 B2 | 12/2016 | Weiss |
| 9,680,942 B2 | 6/2017 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2002/0178370 A1 | 11/2002 | Gurevich et al. |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |

(56) References Cited

U.S. PATENT DOCUMENTS

| | | |
|---|---|---|
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0150687 A1 | 6/2012 | Hart |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0290478 A1 | 11/2012 | Crofts et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0283038 A1 | 10/2013 | Kulkarni et al. |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |

(56) References Cited

U.S. PATENT DOCUMENTS

| | | |
|---|---|---|
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007205 A1 | 1/2014 | Oikonomou |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0129437 A1 | 5/2014 | Desai et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0279556 A1 | 9/2014 | Priebatsch et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0197725 A1 | 7/2016 | Hammad |
| 2016/0217461 A1 | 7/2016 | Gaddam et al. |
| 2016/0224976 A1 | 8/2016 | Basu |
| 2016/0269391 A1 | 9/2016 | Gaddam et al. |
| 2016/0301683 A1 | 10/2016 | Narayan |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi |
| 2017/0186001 A1 | 6/2017 | Reed et al. |
| 2017/0201520 A1 | 7/2017 | Chandoor |
| 2017/0220818 A1 | 8/2017 | Nagasundaram et al. |
| 2017/0228723 A1 | 8/2017 | Taylor |
| 2017/0295155 A1 | 10/2017 | Wong et al. |
| 2017/0303119 A1* | 10/2017 | Ogura .............. G06F 19/322 |
| 2017/0364903 A1 | 12/2017 | Lopez |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012-030162 A2 | 3/2012 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2014049136 | 4/2014 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

(56) References Cited

OTHER PUBLICATIONS

Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
Kaja, et al., U.S. Appl. No. 15/585,077 (Unpublished), System and Method Using Interaction Token, filed May 2, 2017.
Hammad, U.S. Appl. No. 15/977,921 (Unpublished), Integration of Verification Tokens with Mobile Communication Devices, filed May 11, 2018.
Lopez, et al., U.S. Appl. No. 16/020,796 (Unpublished), Embedding Cloud-Based Functionalities in a Communication Device, filed Jun. 27, 2018.
Corella et al., "Strong and Convenient Multi-Factor Authentication on Mobile Devices", Available online at URL: http://pomcor.com/whitepapers/MobileAuthentication.pdf, Sep. 6, 2012, 31 pages.
EP15844796.1 , "Extended European Search Report", dated Apr. 6, 2018, 8 pages.

* cited by examiner

REMOTE SERVER ENCRYPTED DATA PROVISIONING SYSTEM AND METHODS

RELATED APPLICATIONS

This application claims the benefit of and priority to U.S. Provisional Application No. 62/107,966, filed Jan. 26, 2015, and U.S. Provisional Application No. 62/056,401, filed Sep. 26, 2014, the entire contents of which are incorporated herein by reference for all purposes.

BACKGROUND

In order to perform resource access transactions using a mobile device such as a mobile phone, a user may need to provide sensitive user data (e.g., a password, an account number, tokenized information, etc.) to the mobile device. For example, a user may key in sensitive user data into a mobile device, and it may be stored on the mobile device.

A problem associated with using a mobile device for resource access transactions is that the sensitive user data could be obtained by unauthorized persons while it is stored on the mobile device. For example, an unauthorized person could attempt to access the user sensitive data if the authentic user loses his mobile device or if the unauthorized person attempts to hack into the user's mobile device through a data or communications network.

Improved data security methods, systems and devices are needed. Embodiments of the invention address these and other problems, individually and collectively.

SUMMARY

Embodiments of the invention are directed to secure and efficient methods of communicating among the entities involved in the generation, delivery, and storage of secure user data on a mobile device. A mobile device according to an embodiment of the invention can provide sensitive user data (e.g. payment information, account number, social security number, identification number, etc.) to a service provider computer (e.g., a token provider computer) in an encrypted format, so that the mobile device does not have access to the sensitive user data. The service provider computer can then generate a token (i.e., a tokenized version of the user data) and can then transmit the token to the mobile device. The token may be stored on the mobile device and may thereafter be used to conduct resource access transactions (e.g., payment transactions, transactions to access venues, etc.).

One embodiment of the invention includes receiving, by a mobile device from a remote mobile application server, encrypted user data associated with a user of the mobile device. The encrypted user data is generated with an encryption key associated with a token server computer. In some embodiments, the encryption key and the user data associated with the user of the mobile device are stored by the remote mobile application server. The mobile device generates a token request message including the encrypted user data and sends the token request message to the token server computer. The token server computer decrypts the encrypted user data using the encryption key, identifies an account associated with the decrypted user data, generates a token associated with the account, stores the token, and sends the token to the mobile device. The method also includes receiving, by the mobile device, the token associated with the encrypted user data from the token server computer. The mobile device stores the token in a token memory. In some embodiments, the token memory is managed by a token module (e.g. a token software development kit (SDK)) provided on the mobile device. The token module can be associated with the token server computer, and can facilitate the interaction between the mobile device and the token server computer. The token module may interface with an Application Programming Interface (API) of the token server computer.

Embodiments of the invention provide for a number of technical advantages. Even if the token on a mobile device is stolen by an unauthorized user, the impact of the theft and/or disruption to the user is minimal since the token can be easily replaced and/or can be updated periodically (e.g., every few transactions or at a predetermined time interval such as every three to four days). In the above noted example, the mobile device never has direct access to sensitive user data. By preventing the mobile device from having access to the sensitive user data (i.e., in an unencrypted format), the user data may be protected from being stolen, tampered with or otherwise compromised.

In some embodiments, storing the token in a token memory may include storing a token in a secure memory of the mobile device, determining a token key associated with the stored token, and providing the token key to a mobile application on the mobile device for use as a token reference identifier for the token.

In some embodiments, the method may also include requesting, by the mobile device, a status of the token. The method may include receiving, by the mobile device, a token status response from the token server computer. The mobile device may store the status associated with the token in the token memory.

According to various embodiments, the token request message may be sent to the token server computer via a token module provided on the mobile device, and the token associated with the encrypted user data is received from the token server computer by the token module.

In some embodiments, the method also includes interacting with an access device to initiate a transaction using a mobile application provided on the mobile device. The method further includes providing the token to the access device. The token is provided to the access device by a token module bypassing the mobile application. The token module is stored on the mobile device.

In some embodiments, the token request message may be sent to the token server computer via the remote mobile application server, and the token associated with the encrypted user data may be received from the token server computer via the remote mobile application server.

These and other embodiments are described in further detail below.

DETAILED DESCRIPTION

Figure 1:
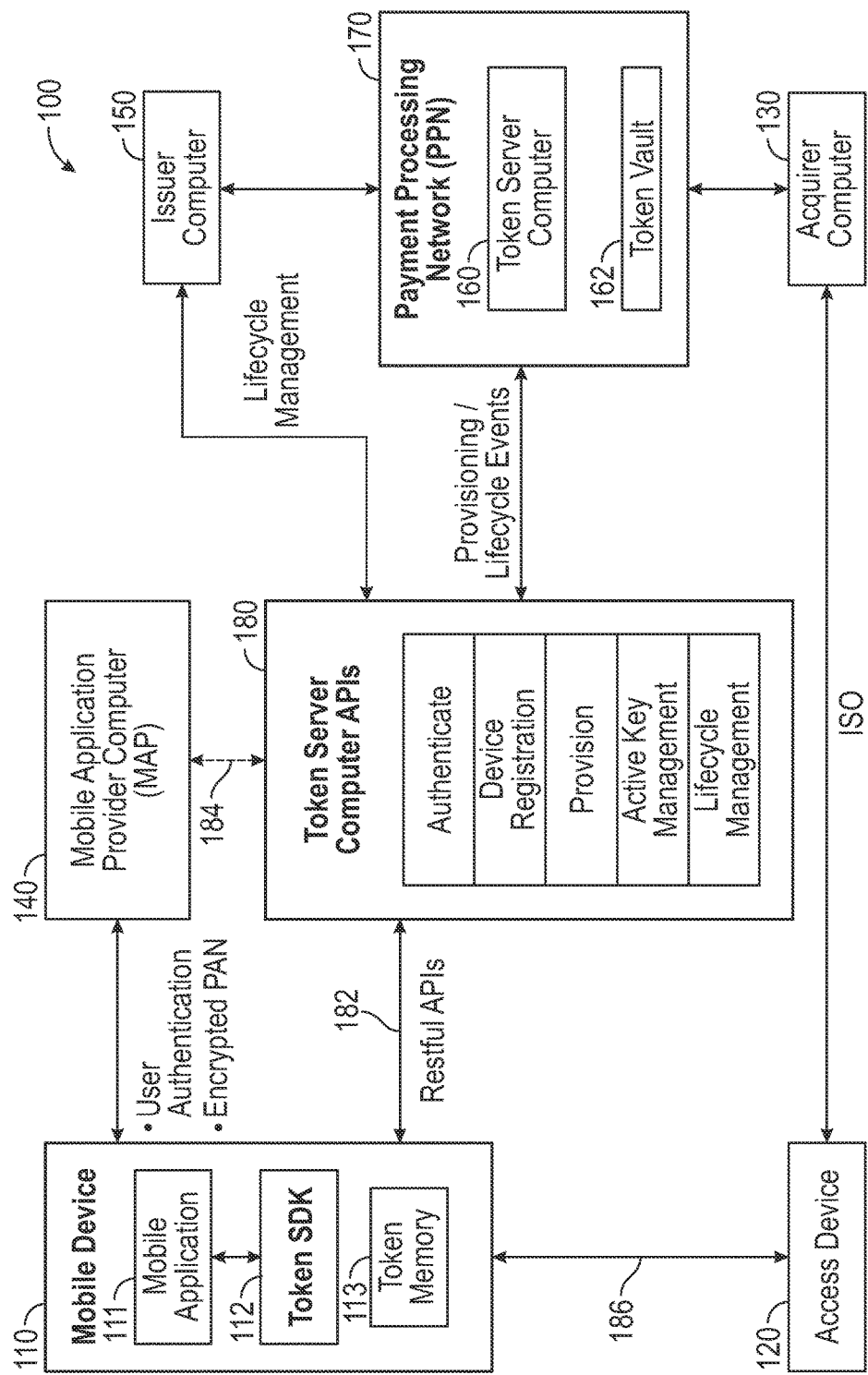
FIG. 1 shows an exemplary token processing system according to an embodiment of the invention.

In order to perform a transaction accessing a resource, sensitive user data (e.g. account number, social security number, identification number, etc. of the user) can be provided to a resource providing entity. Such sensitive user data can be present on a mobile device if that mobile device is used to access the resource provided by the resource providing entity. For example, the user of the mobile device may wish to conduct a transaction with the mobile device. The mobile device should be able to access the sensitive user data to conduct the transaction. If the sensitive user data is on the mobile device, it is susceptible to being obtained by an unauthorized person.

Embodiments of the invention are directed to secure methods of obtaining and storing sensitive user data on the mobile device, as well as efficient methods of communicating the user data to and from entities involved in the securing of the user data for transactions using the mobile device. Embodiments prevent the mobile device having access to and/or storing the sensitive user data in an unencrypted format. As such, the user data protected from unauthorized persons, even when the mobile device is lost, stolen, hacked or otherwise compromised.

Embodiments provide encrypted user data to the mobile device. A token module (i.e. a token software development kit (SDK)) provided on the mobile device may obtain a token representing the user data. The token SDK may obtain the token through a direct interaction with a token server computer that generates the token. Alternatively, the token SDK may interact with a mobile application provider (MAP) computer and request the MAP computer to obtain the token from the token server computer.

The MAP computer may create a mobile application (e.g. a software application with payment capability) on the mobile device. In some embodiments, the mobile application may conduct host-card emulation (HCE) based payments at a point of sale (POS) through the token SDK. For instance, embodiments may be used to perform a near-field communication (NFC) payment transaction at an access device, such as the POS of a merchant, using a token generated by a token server computer (also referred to as a token service, and/or token system). Once generated, the token can be delivered to the mobile device.

The token can a substitute for the sensitive user data. For example, a token may include any data that represents or is associated with a user, such as a payment account identifier issued by an issuer bank, a social security number of the user, an identification number of the user that allows the user to access secure document vaults, secure buildings, etc. Specifically, the token provided by token server computer may represent a user account for a particular mobile application provided on a mobile device of the user. According to some embodiments, multiple tokens can be associated with a single account. Tokens reduce the risk that user sensitive data will be used for fraudulent purposes.

Prior to discussing embodiments of the invention, description of some terms may be helpful in understanding embodiments of the invention.

As used herein, a "mobile device" may include any device that has one or more electronic components (e.g., an integrated chip) that can communicate with another device. A "portable communication device" may be a mobile device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, a mobile vehicle such as a car, portable media player, personal digital assistant devices (PDAs), wearable computing device (e.g., smart watches, fitness bands, ankle bracelets, rings, earrings, etc.), electronic reader device, etc., or in the form of a card (e.g., smart card) or a fob, etc. Examples of portable communication devices may also include portable computing devices (e.g., laptops, netbooks, ultrabooks, etc.).

A "payment device" may include any device that may be used to conduct a financial transaction, such as to provide payment account information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode. According to various embodiments, a mobile device may be used as a payment device.

A "payment account" or an "account" (which may be associated with one or more payment devices) may include to any suitable payment account including a credit card account, a checking account, or a prepaid account.

"Account information" may include any suitable information associated with an account (e.g. a payment account and/or payment device associated with the account). Such information may be directly related to the account or may be derived from information related to the account. Examples of payment account information may include a primary account number (PAN) or "account number", user name, expiration date, CVV (card verification value), dCVV (dynamic card verification value), CVV2 (card verification value 2), CVC3 card verification values, etc. CVV2 is generally understood to be a static verification value associated with a payment device. CW2 values are generally visible to a user (e.g., a consumer), whereas CVV and dCVV values are typically embedded in memory or authorization request messages and are not readily known to the user (although they are known to the issuer and payment processors). Payment account information may also be used as authentication data.

A "token" may include any identifier for a payment account that is a substitute for other data. A token may include, for instance, a series of alphanumeric characters that may be used as a substitute for an original account identifier. For example, a token may be used in place of a primary account identifier or primary account number (PAN). In some embodiments, a token may be "format preserving"; it may have a numeric format that conforms to the account identifiers used in existing payment processing networks. In some embodiments, the token may comprise the same elements in the same order as a PAN. In other embodiments, the token may be of the same size as a PAN, but may include different elements or differently sized elements. In some embodiments, a token can be used in place of a PAN to initiate, authorize, settle or resolve a payment transaction or represent the original account identifier in other systems where the original account identifier (e.g., a PAN) would typically be used.

In some embodiments, a token value may be generated such that the original PAN or other account identifier associated with the token value may not be computationally derived solely from the token. For example, a token may comprise a randomly generated value associated with an original PAN in a lookup table, so that the token cannot be decrypted, reformatted, or otherwise reverse-engineered to determine the original PAN. Rather, in some embodiments, direct or indirect knowledge of the lookup table may be the only way to determine the original PAN corresponding to the token. In some embodiments, an entity that maintains the aforementioned lookup table may be referred to as a "token vault."

In some embodiments, tokens may be device-specific such that each device associated with an account may be provisioned with a particular token. As such, if a transaction uses a token that is initiated by a different device than the device that the token was provisioned into, the transaction may be fraudulent. Accordingly, device information may be stored in the token vault and used to ensure that the device used in a transaction is associated with the token that is being used in the transaction. Additionally, because each token may be associated with a single device, one PAN or account may have multiple tokens associated with it, where each PAN may have a different token for the different devices that may be used to initiate a transaction associated with the PAN using a specific token. This provides additional security for transactions because network token systems have additional information to validate in order to control the use of sensitive information in a transaction processing system.

A token may have a number of token characteristics that prevent misuse. Such characteristics may include the use of a limited use key (LUK), which may be used to create a credential that authenticates the user at the time a transaction occurs. Additionally, a token's use may be limited by the user device on which the token can be used. Further, a token's use may be limited by the number of times a LUK can be used. Accordingly, the transaction count limitation reduces the chance that the token may be repeatedly misused. Furthermore, a token may be limited by duration. For example, a token may be limited to the life of a LUK which prevents the token from being used for longer than a specified duration. This may prevent the token from being misused over an extended period of time.

Furthermore, a token's use may be limited to a particular communication channel. For instance, the token server computer may limit the way in which a token can be transferred, for example, by restricting the use of the token to NFC-based or POS-based transactions. This may prevent the token from being used outside its intended communication channel or domain. Additional restrictions include amount restrictions where token server computer limits the amount of value for which a token can be used. Thus, the amount limitation reduces risk by preventing a token restricted to low-value transactions from being used to make larger purchases. Further, the token server computer may limit tokens to particular merchants at which the token can be accepted which prevents a tokens misuse at other merchants.

Operations on tokens can be divided into several categories: (1) provisioning which includes obtaining a token and activating the token on a mobile device; (2) active key management which includes managing the limited use key (LUK) for an uninterrupted consumer payment experience; and (3) lifecycle management which includes determining the status of a token and suspending, resuming, or deleting a token.

Provisioning includes the generation, delivery, and storage of a token on the mobile device. For example, a token may represent an account number (PAN). The token server computer may provide a token for each account for a mobile application and mobile device. For a mobile application to use a token, the token may be provisioned for the mobile application on the mobile device. An issuer of a payment instrument may authorize the mobile application provider to request and manage tokens associated with the issuer account. A token server computer may include an account registration (onboarding) process which involves collecting information about the mobile application provider organization and allowing for compliance verification. The mobile application provider may be assigned a provider ID, token requestor identifier, and other unique identifiers associated with the token server computer operations during registration.

Active Key Management includes the management and refreshing of limited use keys (LUKs) associated with the tokens. For example, once a token has been provisioned for a device, a LUK may be kept up-to-date to allow for transactions to be processed using the token. In some cases, the LUK can be valid for an extended period of time, similar to a card being issued for a year or more. In some embodiments, the LUK may be short in duration and may require regular replenishment. If a provisioned token is still provisioned on the device, its dynamic data can be replenished periodically, meaning that the LUK associated with the token is updated to extend its duration.

Life-Cycle Management may include any actions to update the status and/or configuration of a token. For example, it may be necessary to change the status of a token. For instance, a mobile application might give an accountholder the ability to remove an account, in which case the mobile application can delete the token representing the account. To add the account later would require re-provisioning of the token.

A "token provisioning request message" may be an electronic message that is sent to request provisioning of a token on a mobile device. The token provisioning request message can be sent to a token server computer. The token provisioning request message may include information that can be used to identify an account. A token provisioning request message may also comprise additional data elements such as one or more of a service code, an expiration date, etc.

A "token provisioning response message" may be an electronic message reply to a token provisioning request message. The token provisioning response message can be generated by a token server computer. The token provisioning response message may include a token issued in response to the token provisioning request message.

The term "transaction" may include an exchange or interaction between two entities. In some embodiments, a transaction may refer to transfer of value between two users (e.g. individuals or entities). A transaction may involve the exchange of monetary funds, the exchange of goods or services for monetary funds, or the exchange of data (e.g. access data) between two parties. In other embodiments, a transaction may involve an individual or entity purchasing goods or services from a merchant or other entity in exchange for monetary funds. In other embodiments, the transaction may be a non-financial-related request, such as exchanging of data or information between two entities, such as the transfer of data.

The term "transaction data" may include information regarding a transaction. The information may include data for a financial transaction (e.g., payment data, transaction total, consumer data). The transaction data may be used for processing a financial transaction. Transaction data may include data for a specific transaction, including items purchased, item prices, total cost, consumer data (e.g., shipping address, email address), payment methods, authentication data, merchant data (e.g., merchant name, merchant location/address), etc. In some embodiments, transaction data may be generated once the user or consumer attempts to submit a transaction for processing. In other embodiments, transaction data may be generated and sent by the merchant system based on items added to a consumer's shopping cart. In some embodiments, transaction data may include information for a non-financial transaction (e.g., alert data, incentive data, product data, etc.). The transaction data may be in any suitable format and may include any suitable information depending on the purpose of the transaction.

Transaction data may be included in a transaction authorization message and/or a transaction clearing and settlement message. In some embodiments, the transaction data may be sent in real-time as a transaction is being performed. In some embodiments, the transaction data may be sent after a transaction has been completed or performed. In some embodiments, the transaction data may be sent to a payment processing network.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

An "issuer" may typically refer to a business entity (e.g., a bank) that maintains an account for a user that is associated with a portable communication device.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

System Overview

Embodiments may be implemented using a token processing system 100 as illustrated in FIG. 1. The token processing system provides encrypted user data (e.g. payment information, social security number, identification number, etc.) to a mobile device, according to an exemplary embodiment of the present invention. The system 100 may include a mobile device 110, a mobile application provider (MAP) computer 140, and a token server computer 160. As illustrated in FIG. 1, the token server computer 160 may be a part of the payment processing network 170. In some embodiments, the token server computer 160 may be a separate computer from and in electronic communication with the payment processing network 170.

The mobile device 110 may include a mobile application 111. The mobile application 111 may be provided to the mobile device 110 by the MAP computer 140. The mobile device 110 may also include a token system software development kit (token SDK) 112 that may obtain and securely store tokens and/or other secure information. In some embodiments, the tokens may be stored in a token memory 113.

The MAP computer 140 may provide a service for users of mobile devices. For example, the MAP computer 140 may be a mobile wallet provider, an issuer, a merchant, or any other suitable entity that provides digital content, applications or services to mobile/cellular device users. For example, the MAP computer 140 may develop, build, and/or provide the mobile application 111 for the mobile device 110. For example, the mobile application 111 may include a mobile wallet application, issuer application, merchant application, etc., that may be downloaded, installed, and used on the mobile device 110. The mobile application 111 may provide a user interface for various functions, such as mobile payments, account services (e.g., balance inquiry, customer service, etc.), peer-to-peer (P2P) money transfers, or any other relevant functionality or capability associated with a service provider and/or the MAP computer 140.

The MAP computer 140 may also store sensitive user data (e.g. payment information, social security number, identification number, etc.) associated with a user of the mobile device 110. The MAP computer 140 may also store an encryption key associated with (and/or provided by) the token server computer 160. The MAP computer 140 may use the encryption key to encrypt the user data and provide the encrypted user data to the mobile device 110.

The mobile device 110 may provide the encrypted user data to the token server computer 160 to receive a token representing the encrypted user data. For example, when the encrypted user data includes payment information (e.g. a payment account number), the token may be a payment token that acts as a proxy for the payment information. That is, the token can be provided for a transaction instead of the actual payment information.

According to the embodiments of the invention, token(s) can be provisioned on the mobile device 110 in two ways: the token SDK 112 may be in direct communication 182 with the token server computer 160 (through the token server computer application programming interfaces (APIs) 180) to request and receive token(s) from the token server computer 160. Alternatively, the token SDK 112 may request the MAP computer 140 to retrieve the token(s) from the token server computer 160. In the latter scenario, the MAP computer 140 may be in direct communication 184 with the token server computer 160 (through the token server computer APIs 180) to request and receive token(s) from the token server computer 160.

The token server computer 160 may be a server configured to receive a token request (also referred as a token provisioning request or a token request message), decrypt encrypted user data incorporated in the token request, identify an account (e.g. a payment account) associated with the user data, generate a token associated with the account, store the token, and/or provide the token to the mobile device 110. The token server computer 160 may be associated with a payment processing network 170 (e.g., VisaNet™, MasterCard™, etc.) or any other suitable entity. The token server computer 160 may generate and/or receive cryptographic keys for encrypting and decrypting user data incorporated in a token provisioning request. The token server computer 160 may also provide one or more cryptographic keys to the MAP computer 140 so that the MAP computer 140 can encrypt the user data using the cryptographic keys provided by the token server computer 160.

The token server computer 160 may also include or communicate with a token vault 162 that stores a token status for the various tokens managed by the token server computer 160 in a token status database. The token status may include any of active, suspended, obsolete, deleted, and/or not_found. The token status database may store records associated with the tokens, such as the user data and/or account information associated with a token, token servicing information, and/or whether a certain token is active, suspended, under review, canceled, etc. The token generated by the token server computer 160 may be provided to the token SDK 112 provided on the mobile device 110. The token SDK 112 may store the token at a token memory 113.

The token server computer 160 may use a range of protection controls to harden and tamper-proof the token SDK 112 against attacks and reverse engineering. One of the protections is the use of white-box cryptography (WBC) to secure keys and sensitive token data. WBC is necessary because a mobile device 110 operates in an untrusted, open, environment that can be observed by third parties. WBC protects token SDK 112 assets through data and code obfuscation by using additional cryptographic techniques to transform the key and related operations so that sensitive data cannot be discovered in such an environment.

The token SDK 112 may comprise any application programming interface (API), service, application, applet, or other executable code suitable to communicate with the mobile application 111 and/or the token server computer 160. The token SDK 112 may be associated with the token server computer 160, the payment processing network 170, or any other suitable entity. The token SDK 112 may be configured to allow the mobile application 111 to interface with the token server computer 160. Thus, the token SDK 112 may receive commands associated with the token server computer 160 from the mobile application 111 and may be configured to receive encrypted user data (e.g. encrypted payment information) from the MAP computer 140 through the mobile application 111. The token SDK 112 may interface with the token server computer 160 through the token server computer APIs 180 to process and store the token at the token memory 113. The token memory 113 may be memory on the mobile device 110 for storing encrypted user data, tokens (e.g. payment tokens), and any other suitable information. The token memory 113 may be secure for storing payment information.

The token SDK 112 may be in direct communication 182 with the token server computer 160 (through the token server computer APIs 180) and request payment tokens from token server computer 160. Moreover, the token SDK 112 may be able to provide payment information for a mobile payment transaction in response to a request from the mobile application 111 in order to complete a payment transaction with an access device 120.

According to various embodiments, actual tokens may be stored securely at the token memory 113 and may not be exposed to the mobile application 111. Rather, the token SDK 112 may generate a token key for each token. The token key may be a unique number, symbol, string or a combination thereof that identifies the token in the token memory 113. However, the token key may not be used in place of the token. For example, if the token key is generated for a payment token, the token key cannot be used to conduct a payment transaction. The token key may be provided to the mobile application 111. The mobile application 111 may provide the token key to the token SDK 112 during a transaction and request (or automatically cause) the token SDK 112 to retrieve the payment token from the token memory 113. Accordingly, the mobile application may not have access to the user data in a decrypted format or the token representing the user data. This may prevent unauthorized access to the secure data when the mobile device is lost, stolen or compromised. The token SDK 112 may manage the token data to, for example, (1) identify a specific token based on a request by the mobile application 111, (2) conduct a transaction on behalf of the mobile application 111 using the token, (3) send requests to token server computer 160, and/or (4) manage lifecycle of tokens, including the use of Limited Use Keys (LUKs).

In some embodiments, the token SDK 112 may have various capabilities. For example, the token SDK 112 may (1) provide an orchestration service that meets the needs of the mobile device 110 using the token server computer APIs 180; (2) enable communication between the mobile device 110 and the access device 120 using the mobile application (e.g., Visa™ payWave™) standards; (3) provide device identification information to ensure that the token is bound to a specific mobile device; and (4) manage the stored token and associated account parameters (e.g., using a token key), the user data, and API authorization and channel encryption. Overall, the token SDK 112 may ensure the security of sensitive token data. The token SDK 112 may combine multiple functional components that implement these foregoing capabilities within the token SDK 112 or may provide separation of capabilities to make them independently available such that each component may be implemented as a plugin, e.g. a storage plugin from a third-party.

According to various embodiments, the capabilities of the token SDK 112 may allow a user of the mobile device to: (1) add a payment account (e.g. a credit or debit card) to the mobile device; (2) use the payment account to conduct a transaction at an access device (e.g. using NFC capability); (3) reverse the payment transaction (e.g. when returning previously purchased items); and (4) delete a token previously provisioned to the mobile device without the need to cancel and reissue a payment device. The token SDK 112 may user token server computer APIs 180 to handle these foregoing operations related to application and token manipulation.

In some embodiments, a status check method may be implemented to check the status of a token. The status data may be fetched and returned to the token SDK 112 so the token statuses can be stored locally. The token status may include any of active, suspended, obsolete, deleted, and/or not_found. The token status may be stored at a token status database stored at the token memory 113. The token status database may be periodically or continuously updated with token status information. For example, if a token is reported as compromised, the token status database may update the record for that token.

The token SDK 112 may periodically request token status information from the token server computer 160. The token SDK 112 may send a token status request message including one or more tokens or token keys stored at the token memory 113. The token server computer 160 may identify the status of the one or more tokens in the token status database, and may provide the token status information to the token SDK 112. The token SDK 112 may then store the token status information at the token memory 113. Thus, the mobile device 110 may maintain updated information about the status of any stored tokens.

In some embodiments, the token SDK 112 may request token status updates after a certain predetermined time-period (e.g. 1 week or 2 months). In some embodiments, the token SDK 112 may request token status updates after a token expires or after a certain number of uses. In some embodiments, if a token status indicates that a token is suspended and under review, the token SDK 112 may check for status updates from the token server 160 more frequently. In some embodiments, the token sever 160 may push token status updates to the mobile device 110.

In some embodiments, a token may expire after a certain time period or a certain number of uses, and the token SDK 112 may retrieve a replacement token from the token server 160.

Methods for Provisioning Token(s) on a Mobile Device

As provided above, the systems illustrated in FIG. 1 may be used to provision token(s) on a mobile device 110. According to various embodiments, the MAP computer 140 may provide encrypted user data to the mobile device 110. The mobile device 110 may request, from a token server computer 160, a token representing the encrypted user data. The mobile device 110 may request the token from the token server computer 160 via the token SDK 112 or the MAP computer 140. The token may then be used to conduct transactions using the mobile device 110. Accordingly, the sensitive user data is never provided to and/or stored on the mobile device 110 in an unencrypted format. Thus, the user data is protected from security attacks or when the mobile device 110 is lost or stolen.

Figure 2:
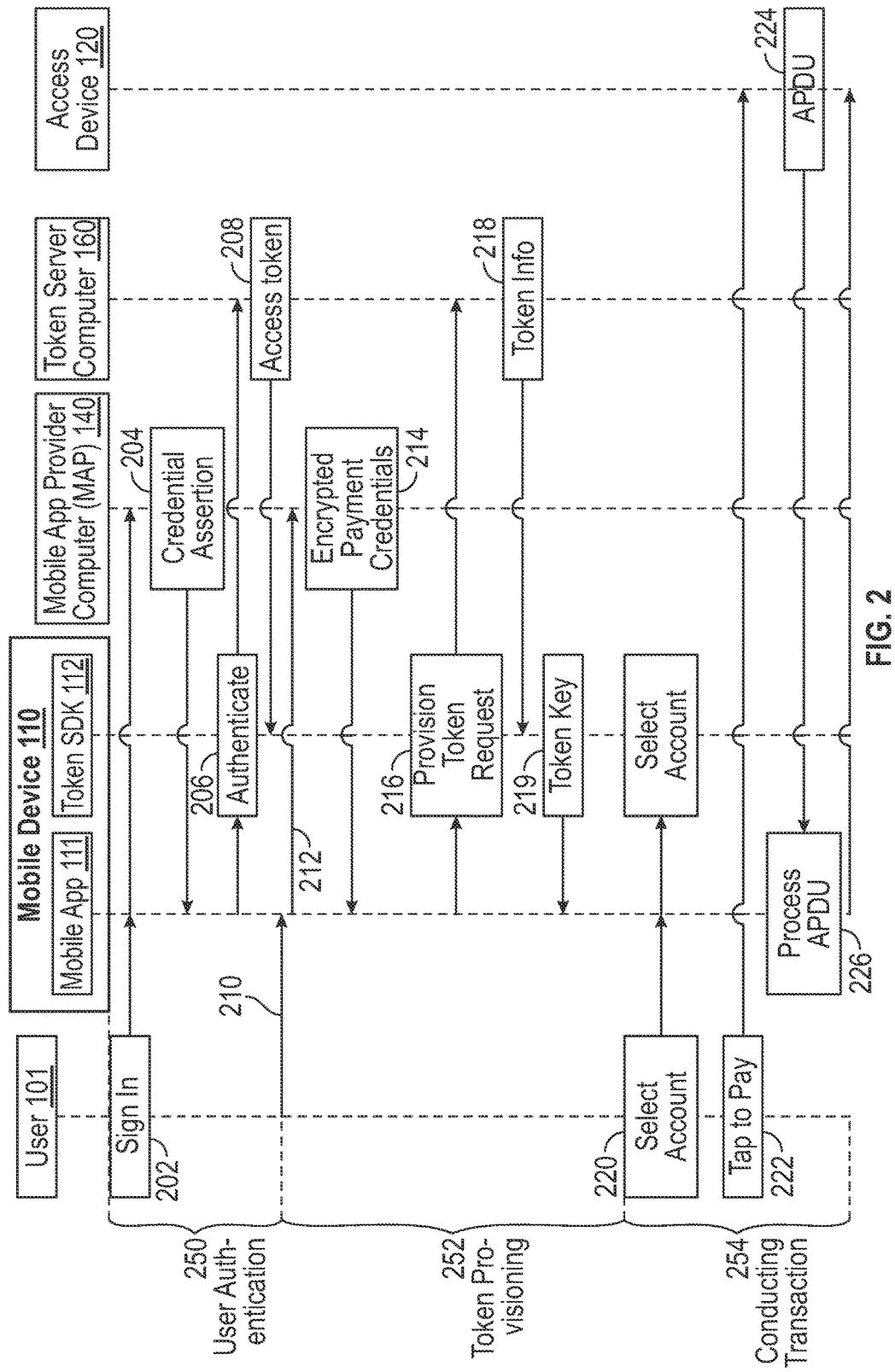
FIG. 2 shows a flow diagram of a method for providing encrypted user data to a mobile device for provisioning a token on the mobile device and using the token to perform a transaction, according to an embodiment of the present invention.

FIG. 2 shows a flow diagram of a method for providing encrypted user data to a mobile device for provisioning a token on the mobile device and using the token to perform a transaction, according to an exemplary embodiment of the present invention. The flow diagram illustrated in FIG. 2 may be grouped into three phases: a user authentication phase 250, a token provisioning phase 252 and conducting a transaction phase 254.

The user authentication phase 250 may start at step 202 with a user of the mobile device 110 signing in at the mobile application 111. For example, the user may provide credentials (e.g. username and password) to the mobile application 111. The mobile application 111 may send the user's credentials to the MAP computer 140 for authentication. The MAP computer 140 may authenticate the credentials against a stored set of user credentials which may be created when the user previously registers with the MAP computer 140.

The user authentication phase 250 may continue at step 204 with the MAP computer 140 sending a response to the mobile application 111 confirming that the user was authenticated. For example, the MAP computer 140 may send a cryptogram, (e.g. an encoded string, a user identity token or a JSON Web Token (JWT)) to the mobile application 111 that asserts the identity of the user 101. The MAP computer 140 may provide multiple cryptograms to the mobile application 111. Each cryptogram may be associated with a piece of sensitive user data such as an account number, a social security number, an identification number, etc.

At step 206, the mobile application 111 may request the token SDK 112 to authenticate the user with the cryptogram. The token SDK 112 may then send the cryptogram to the token server computer 160.

The user authentication phase 250 may end at step 208 where, after the token server computer 160 successfully authenticates the cryptogram, the token server computer 160 responds to the token SDK 112 with an access token. The access token may be different than a payment token. The access token may not be used to conduct a payment transaction. Rather, the access token may be managed by the token SDK 112, and may allow the mobile application 111 to access the token server computer 160 for a certain amount of time (also referred as time to live (TTL)). The access token may bind the cryptogram (e.g. JWT) provided by the MAP computer 140 to the mobile application 111 requesting token system interaction. This binding may enable the MAP computer 140 to enhance and control the user experience. The MAP computer 140 may also choose when to authenticate the consumer (when TTL for access token expires) for continuing to use the token server computer 160.

Figure 3:
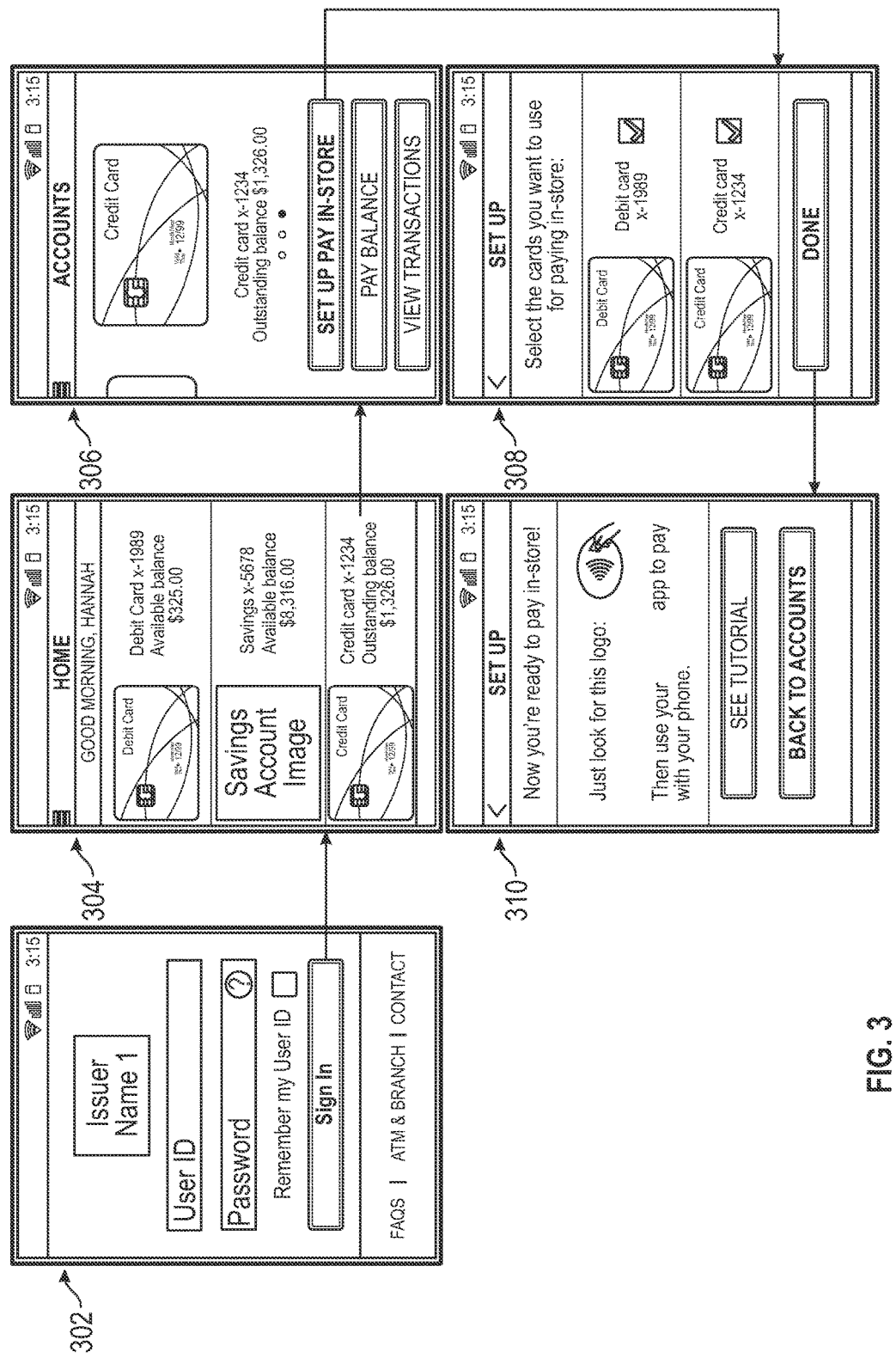
FIG. 3 shows a series of screenshots showing a consumer's configuration and payment experience using a mobile application configured to be used with a token processing system, according to an embodiment of the present invention.

FIG. 3 shows screenshots of the mobile application 111 for a number of steps discussed in connection with FIG. 2. Specifically, FIG. 3 shows a series of screenshots showing a user configuration and payment experience using a mobile application configured to be used with a token processing system, according to an exemplary embodiment of the present invention.

The first screenshot shown in FIG. 3 illustrates a sign in screen 302 which corresponds to the step 202 of FIG. 2. In the sign in screen 302, the user may enter their credentials, such as username and password to access/sign in to the mobile application 111. Once the user provides their credentials on the sign in screen 302, authentication phase steps 204-208 discussed above may occur in the background, i.e. the mobile device screen may not display these steps.

After authentication, an access token may be created by the token SDK 112 on the mobile device 110 to identify the user in other calls through the token SDK 112. The use of the access token may be transparent to the mobile application 111. However, the mobile application 111 can keep the access token alive by re-authenticating the user before the access token expires.

The token provisioning phase 252 of FIG. 2 is discussed next.

The token provisioning phase 252 may start at step 210 with the user 101 choosing the user data to be provisioned with token(s) from the list of available user data displayed through the mobile application 111. For example, the user may wish to provision one or more account numbers on the mobile device 110. The mobile application 111 may display a list of available account numbers for provisioning.

Exemplary screenshots of the payment account selection 304 and payment account selection confirmation 306 are illustrated in FIG. 3. The payment account selection screenshot 304 displays a list of available user data for provisioning in the mobile device 110. In the exemplary embodiment illustrated in FIG. 3, the user may select the last credit card displayed on the screen for provisioning. The payment account selection confirmation screenshot 306 displays the selected user data (e.g. selected credit card) and asks the user whether the user wishes to set up the account to be used in transactions, or perform other action with the account (e.g. pay balance, view transactions, etc.). The set up screenshot 308 may provide the user with other user data (e.g. other payment accounts) that may be provisioned along with the selected user data. The user may simply select more than one of the displayed user data for concurrent provisioning. In some embodiments, tokens may be pre-provisioned for payment accounts that are associated with an issuer that supports token provisioning without the user requesting each specific account to be provisioned. Thus, the user selection of the payment account(s) may merely activate a pre-provisioned token. Alternatively, when the pre-provisioned token exists, no selection may be necessary in order to provision the account information.

The token provisioning phase 252 may continue at step 212 where the mobile application 111 requests the MAP computer 140 to send user data (e.g. account number, identification number, etc.) for the selected account(s). In some embodiments, step 212 may be optional and the MAP computer 140 may send the encrypted user data to the mobile application 111 without being prompted by the mobile application 111.

At step 214, the MAP computer 140 may use an encryption key associated with the token server computer 160 (e.g. an encryption key previously provided to the MAP computer 140 by the token server computer 160) to encrypt the user data. The MAP computer 140 may securely store the encryption key and the user data. For example, the MAP computer 140 may encrypt a primary account number (PAN), expiration date, CVV, name, address, social security number, identification number or any other suitable information associated with the user. In some embodiments, the MAP computer 140 may encrypt and send encrypted payment information for each payment account that is configured and/or has the ability to be tokenized. The MAP computer 140 may send the encrypted user data to the mobile application 111. The mobile device 110 receives the encrypted user data sent from the MAP computer 140.

For example, some embodiments may use JSON Web Encryption to encrypt sensitive information. Accordingly, the MAP computer 140 may wrap the user data in a JSON Web Encrypted (JWE) object) and send the JSON Web Encrypted (JWE) object to the mobile device 110 for each piece of sensitive user data. Typically, encrypted input parameters may be constructed on the MAP computer 140 and sent to the mobile application 111. Sensitive data involved with encryption may not be stored in the mobile application 111 itself. For example, API keys, shared secrets, user information and/or payment information (e.g. PAN) may not be transmitted to the mobile device 110 unencrypted in some embodiments. According to various embodiments, user data may be encrypted using the JSON Web Token (JWT) Utility.

As part of the token provisioning phase 252, at step 216, the mobile application 111 may request that the token SDK 112 generate a token provisioning request message for the selected user data (e.g. selected account number(s)). The token provisioning request message may include the encrypted user data received from the MAP computer 140. For example, the mobile application 111 may request the token SDK 112 to obtain or retrieve tokens for the received encrypted user data associated with the one or more accounts issued by the issuer 150 and managed by the payment processing network 170. The token SDK 112 may then generate the provisioning request message including the encrypted user data.

The token SDK 112 may send the provisioning request message to the token server computer 160 using the token server computer APIs 180. For example, the token SDK 112 may transmit the provisioning request message to the token server computer 160 via a secure communication channel. In some embodiments, the token SDK 112 may send the provisioning request message to the token server computer 160 over a representational state transfer (REST)-ful application programming interface (API) that connects the token SDK 112 and the token server computer 160.

The token server computer 160 may use an encryption key to decrypt the user data, identify an account associated with the decrypted user data, generate a token associated with the account, store the token and send the token to the token SDK 112. Additionally, in some embodiments, the token server computer 160 may determine a previously generated token associated with the decrypted user data, obtain information (e.g. a token key identifying the token) associated with the token, and return the token information to the mobile device 110 in response to a request from the mobile application 111 using the token SDK 112.

At step 218, the token SDK 112 may receive the token associated with the encrypted user data from the token server computer 160. The token SDK may store the token at the token memory 113 that cannot be easily accessed by other applications and/or parties. In some embodiments, the token SDK 112 may associate the token with a token key or other token reference identifier for locally stored tokens on the mobile device 110.

The token provisioning phase 252 may end with step 219 where the token key is provided to the mobile application 111. The token key may be used by the token SDK 112, stored in the token memory 113, and/or the mobile application 111 to identify the token. The token key may not be used by third parties to initiate transactions, i.e. the token key may not replace or act as a token. Rather, the token key may serve as at token reference identifier that identifies the token. Accordingly, the token key provides additional security and can be shared with the mobile application 111 because the token key is not an account substitute and cannot be used to process a transaction outside of the mobile payment application 111 or token SDK 112 on the mobile device 110. In some embodiments, the token SDK 112 may generate the token key, while in other embodiments, the token server computer 160 may provide the token key to the token SDK 112 or the mobile application 111. For example, the token key may include a random generated number that is associated with the actual token to identify the token and/or corresponding account that is the subject of the initial token provisioning request.

The user may be informed of the successful completion of the token provisioning phase 252 with the confirmation screenshot 310 illustrated in FIG. 3.

Next, the token provisioning method may be called to create the token provisioning request. The request may be handled by the token server computer 160, which creates the token and returns information about the token to the token SDK 112. This information is stored securely in a token memory 113 on the mobile device 110 by the token SDK 112. A token key to the token may be made available to the mobile application 111. The token key may be used by the mobile application 111 in other calls to the token SDK 112 to identify the token.

The conducting a transaction phase 254 of FIG. 2 is discussed next.

Steps 220-226 illustrated in FIG. 2 may fall under the conducting a transaction phase 254. Specifically, conducting a transaction phase 254 starts at step 220 when the user selects an account via the mobile application 111 to initiate a transaction. For example, the user may select a payment account to be used in a mobile payment transaction. The token SDK 112 may be notified of the account selection.

At step 222, in order to initiate the transaction using the mobile application 111, the user may bring the mobile device 110 in proximity of a short range communication-enabled access device 120 (e.g. NFC-enabled merchant POS terminal) to interact with the access device 120.

At step 224, the access device 120 may send an application protocol data unit (APDU) message to the mobile application 111, beginning a series of APDU messages being transferred between the access device 120 and the mobile application 111.

At step 226, the token SDK 112 processes the APDU message received by the mobile application 111 using a mobile payment application (e.g., Visa™ PayWave™, etc.) configured to perform a contactless communication protocol exchange and/or NFC transaction. The SDK 112 may respond to the access device 120 with its own APDU messages. The mobile application 111 may pass the requests received from the access device 120 to the token SDK 112. Similarly, the mobile application 111 may receive responses from the token SDK 112 and passes the responses to the access device 120. For example, the mobile application 111 may send the token key associated with the selected account to the token SDK 112, and the token SDK 112 may retrieve the token associated with the token key from the token memory 113. Then, the token SDK 112 may instruct a short range communication component on the mobile device 110 (e.g., an NFC transmitter) to provide the token to the access device 120 for the transaction. As such, the token may be provided to the access device 120 from the token SDK 112, bypassing the mobile application 111.

During conducting a transaction phase 254, the card selecting method may be called, specifying a token key, to select the card (e.g. payment account) for NFC tap-and-pay transactions.

After completing the token SDK integration, the mobile application 111 may be ready to respond to the access device during a transaction.

Token System Integration Configurations

According to various embodiments, the communication between the mobile device 110 and the token server computer 160 to send the token provisioning request and receive the provisioned token may be implemented by two different token server computer integration configurations: in a first integration illustrated in FIGS. 4-8, the token server computer SDK 112 communicates with the token server computer 160 directly; in a second integration option illustrated in FIGS. 9-13, the token server computer SDK 112 communicates with the token server computer 160 through the MAP computer 140. Each of these options is discussed next.

I. Token SDK-to-Token Server Computer Integration Option

Figure 4:
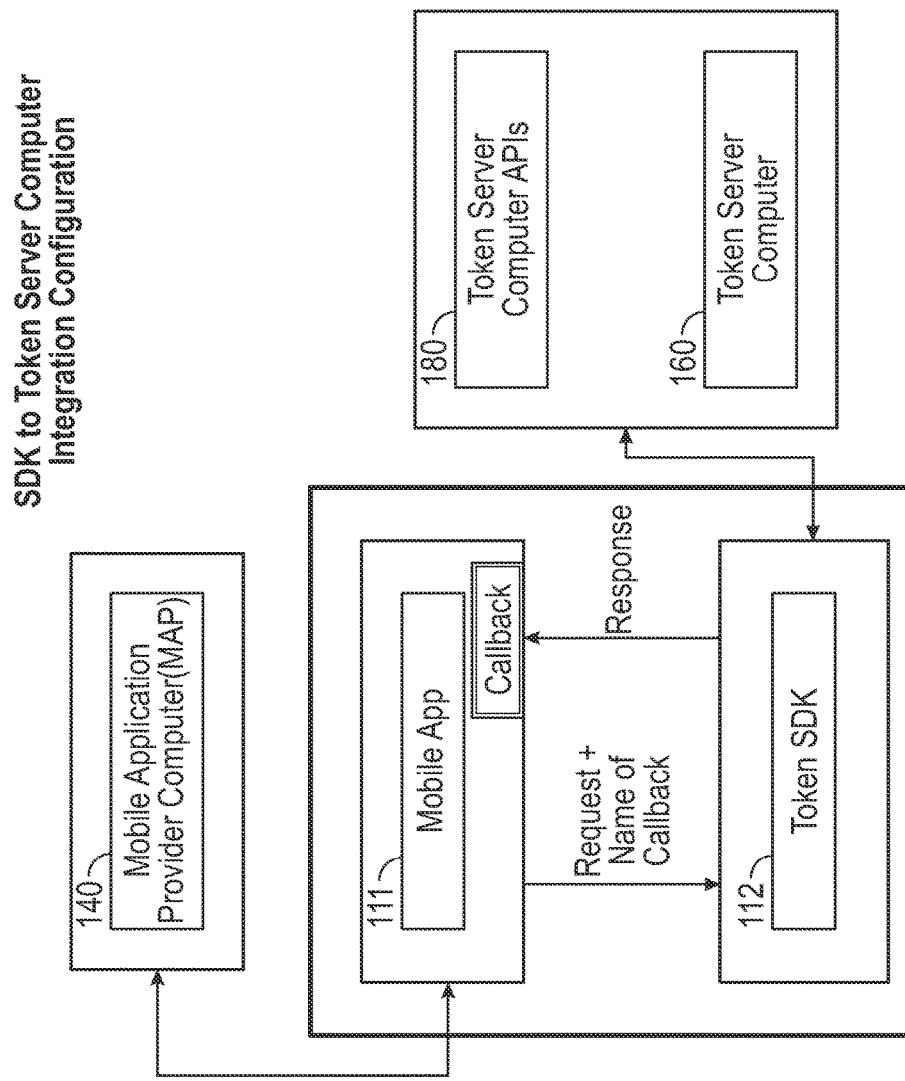
FIG. 4 shows a first exemplary integration where the token SDK directly communicates with the token server computer using token server computer APIs, according to an embodiment of the present invention.

FIG. 4 illustrates the token SDK-to-token server computer integration where the mobile application 111 interacts with the token server computer 160 through the token SDK 112.

As discussed above, the mobile application 111 may receive encrypted user data (e.g. encrypted payment data such as encrypted payment account number) from the mobile application provider (MAP) computer 140. The mobile application 111 may pass the encrypted user data to the token SDK 112 for obtaining a token representing the account associated with the encrypted user data. The mobile application 111 may request the token SDK 112 to obtain the token from the token server computer 160.

In this first exemplary integration configuration, the token SDK 112 directly communicates with the token server computer 160 using token server computer APIs 180. In the token SDK-to-token server computer integrations, the token SDK 112 hides the complexity of communicating with the token server computer 160. The token SDK 112 handles all interaction with token server computer 160 and provides a result to the mobile application 111. For example, when the token SDK 112 receives the request from the mobile application 111, the token SDK 112 sends a token request message to the token server computer 160. The token request message may include the encrypted user data provided by the MAP computer 140 to the mobile application. When the token SDK 112 receives a token from the token server computer 160, the token SDK 112 may notify the mobile application 111 that the token has been successfully received, without passing the token to the mobile application 111. In some embodiments, the token SDK 112 may generate a token key representing the token. Alternatively, the token server computer 160 may provide the token key along with the token to the token SDK 112. The token SDK 112 may send the token key to the mobile application 111, without passing the token to the mobile application 111.

The communication between the mobile application 111 and the token SDK 112 may be handled by calling methods. The token request method may take an object containing input parameters (e.g. the encrypted user data) and a callback object (requesting the token SDK 112 notify the mobile application 111 when/if the token is received). For example, in some embodiments, the mobile application developer may define a callback class from which the callback object is created. The callback class may define two methods, success (successful receipt of the token) and failure (the token is not provided to the mobile device), in which the mobile application developer specify the actions to take for success and failure methods, respectively. The callback may return either a response object or an error object to communicate information from the token SDK 112 to the mobile application 111. Accordingly, the token SDK APIs may implement a callback that informs the mobile application 111 of success or failure of a requested operation.

Figure 5:
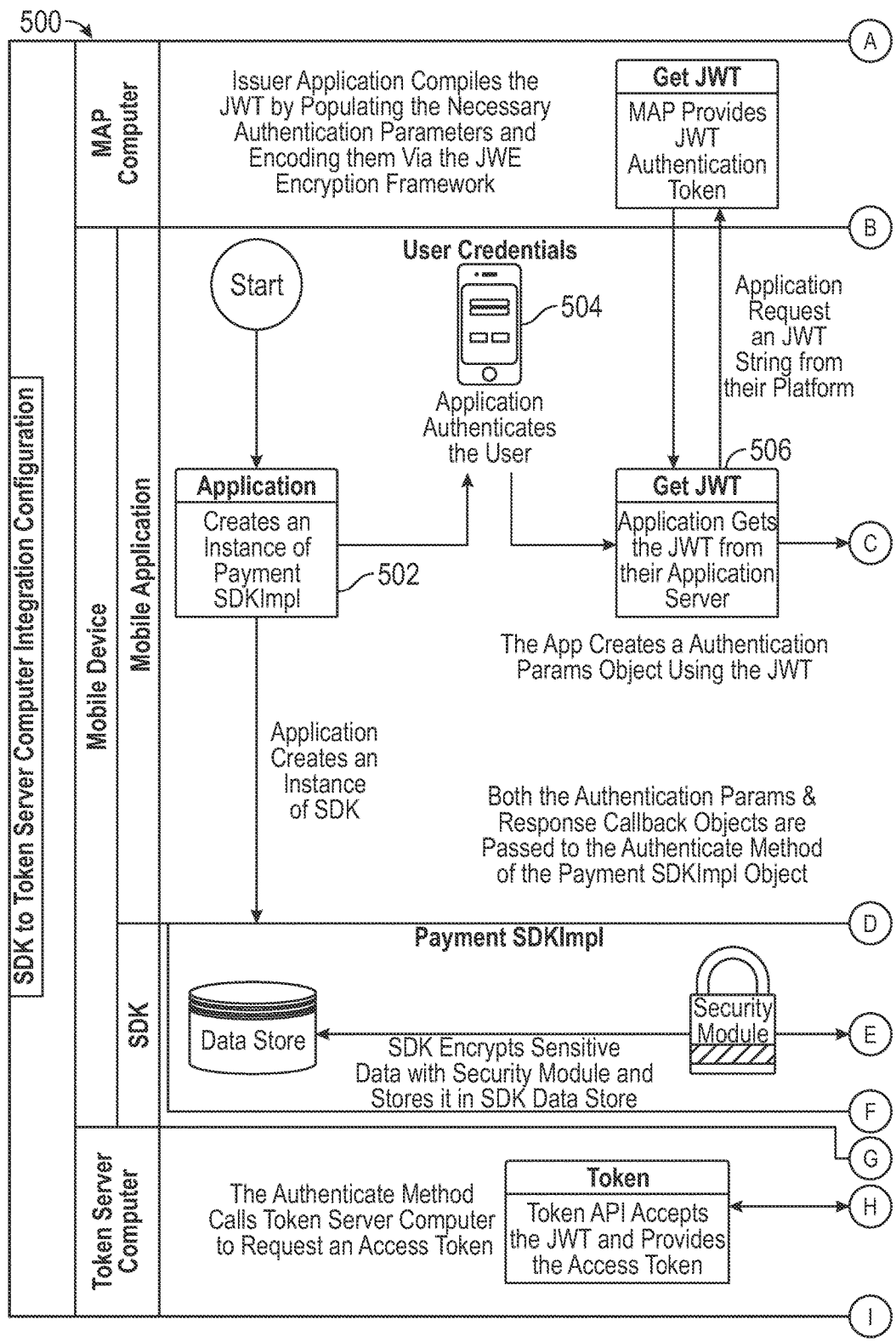
FIG. 5 shows a flow diagram of an exemplary authentication process for a system with the first exemplary integration configuration corresponding to the SDK to token server computer integration configuration illustrated in FIG. 4.
Figure 5:
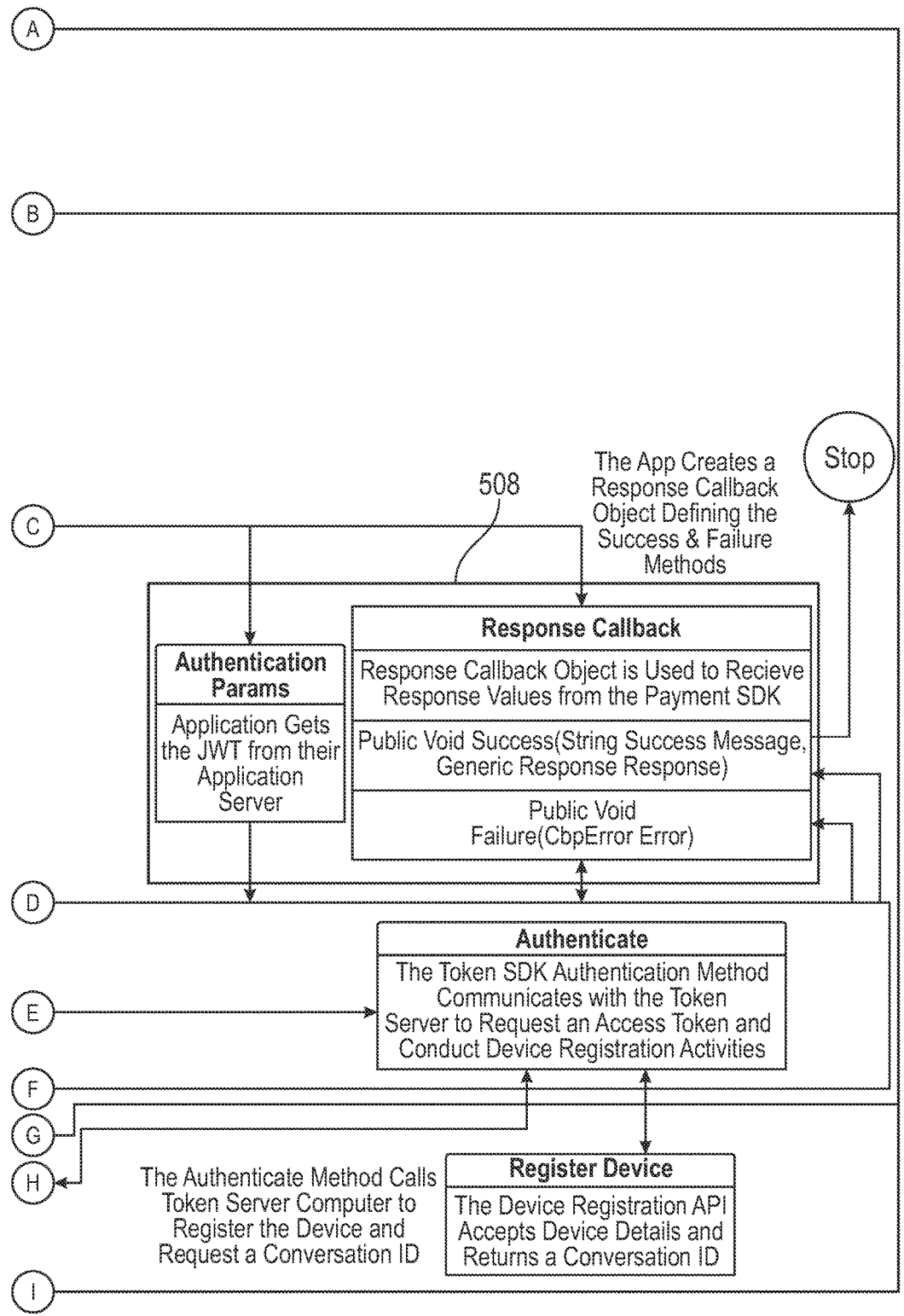
Figure 6:
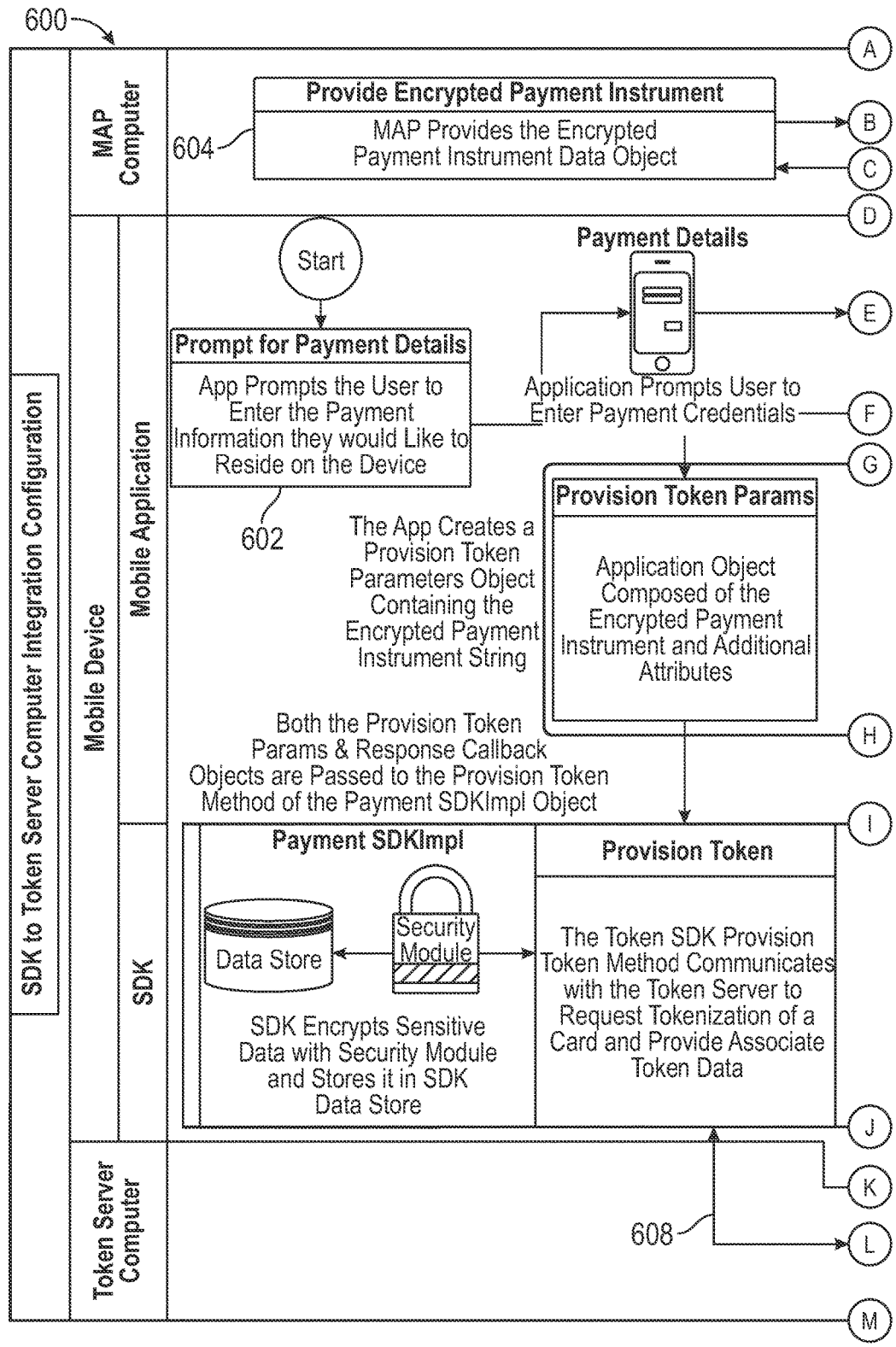
FIG. 6 shows a flow diagram of an exemplary provisioning process for a system with the first exemplary integration configuration corresponding to the SDK to token server computer integration configuration illustrated in FIG. 4.
Figure 6:
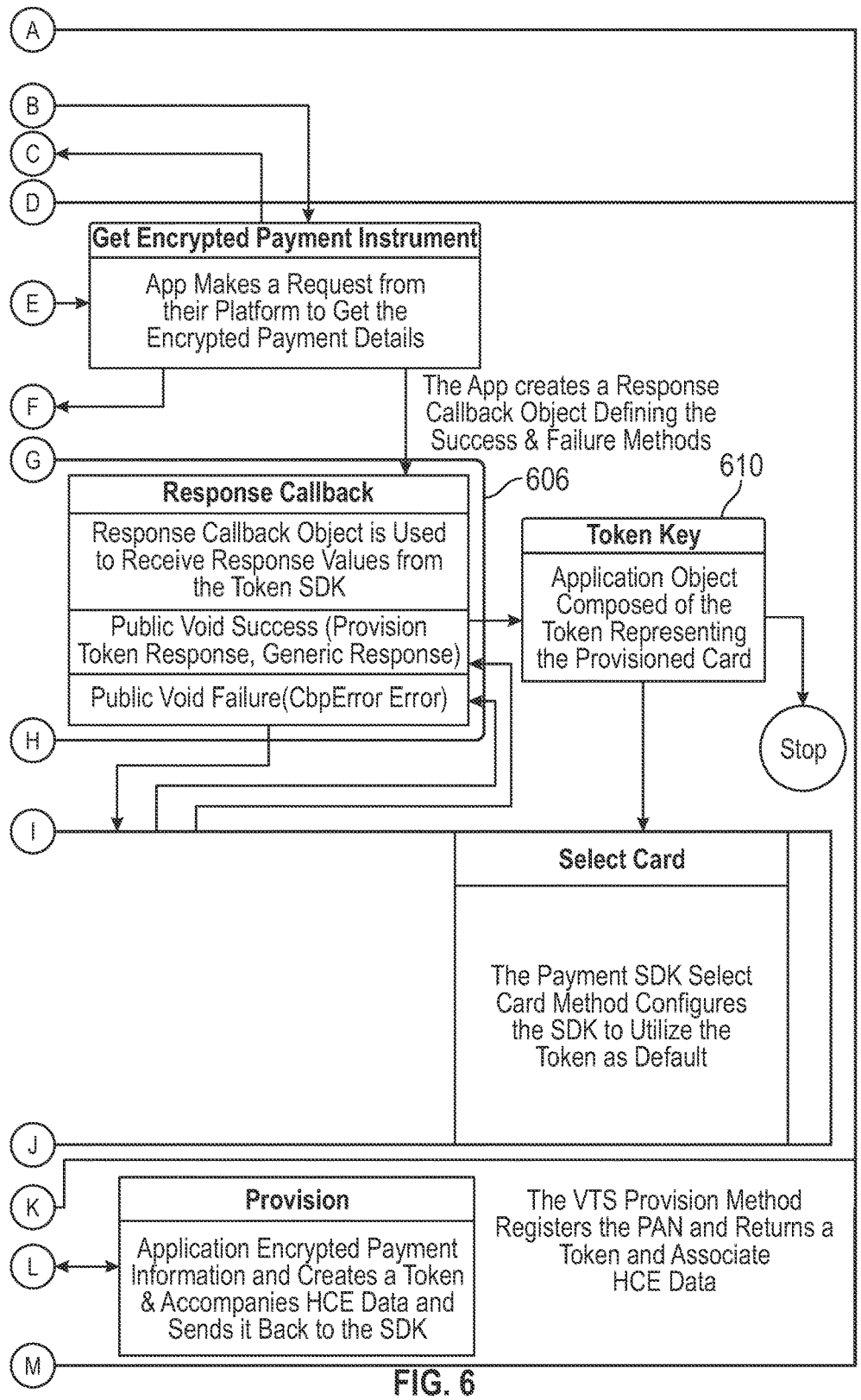
Figure 7:
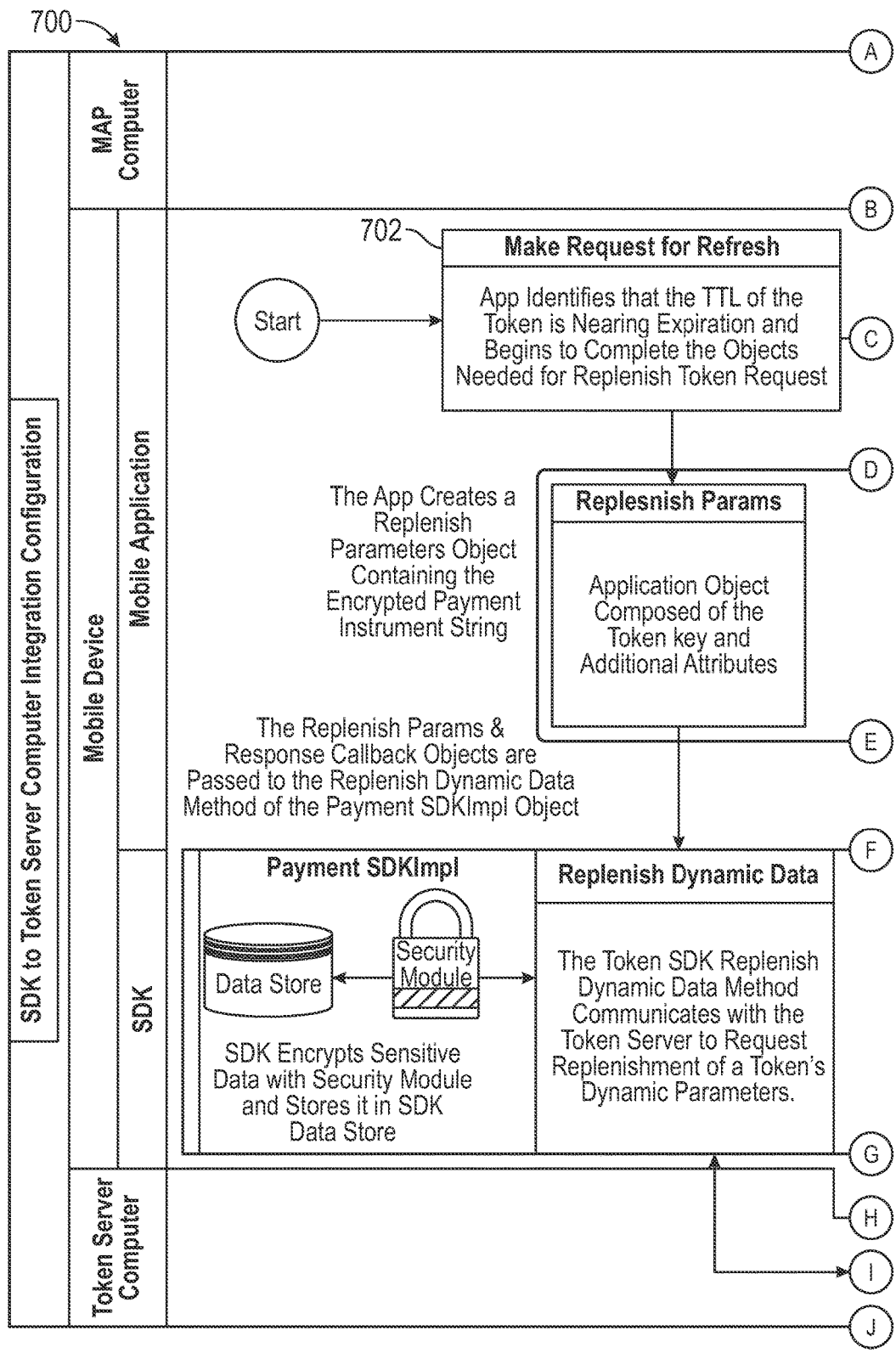
FIG. 7 shows a flow diagram of an exemplary dynamic parameter replenish process for a system with the first exemplary integration configuration corresponding to the SDK to token server computer integration configuration illustrated in FIG. 4.
Figure 7:
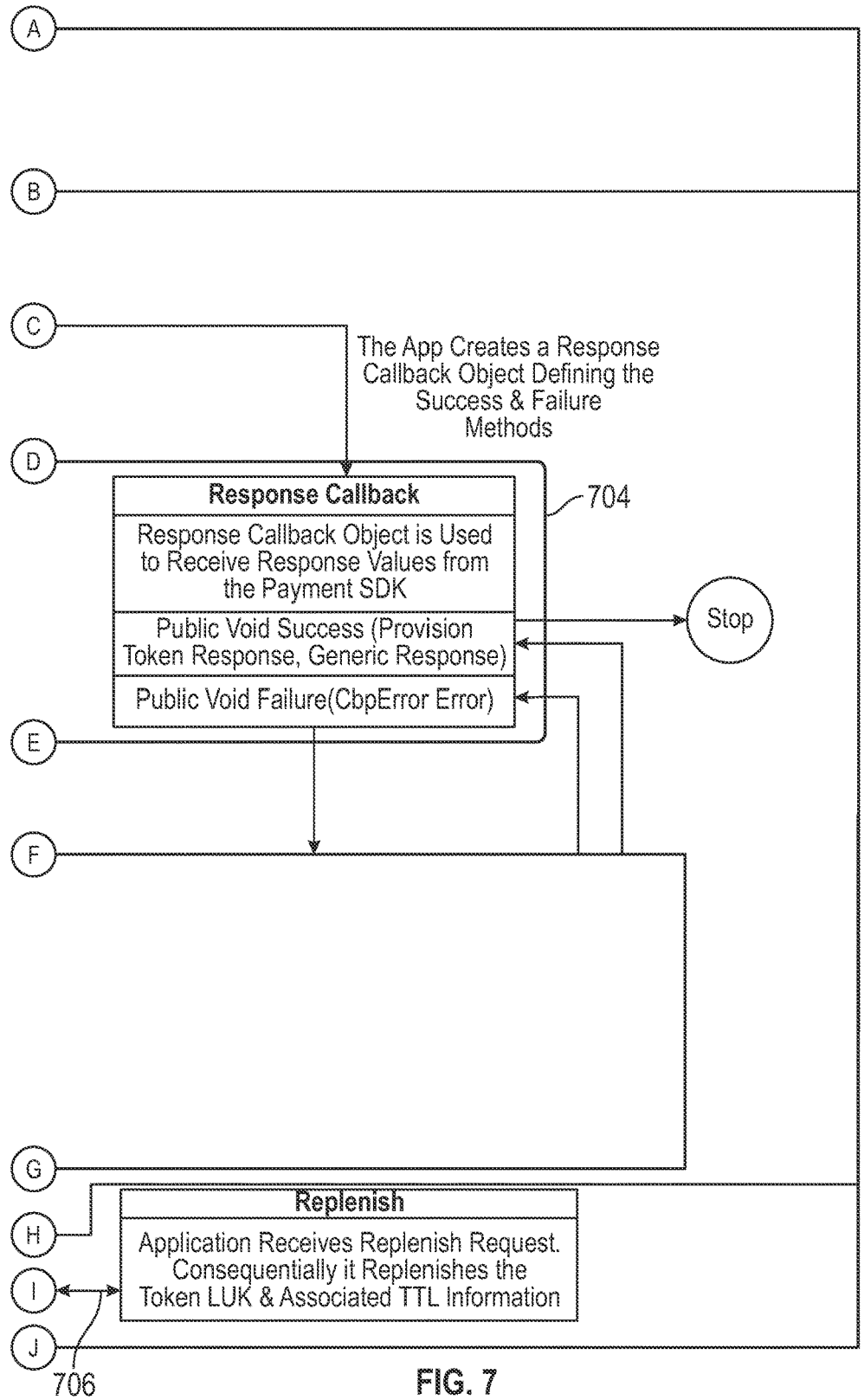
Figure 8:
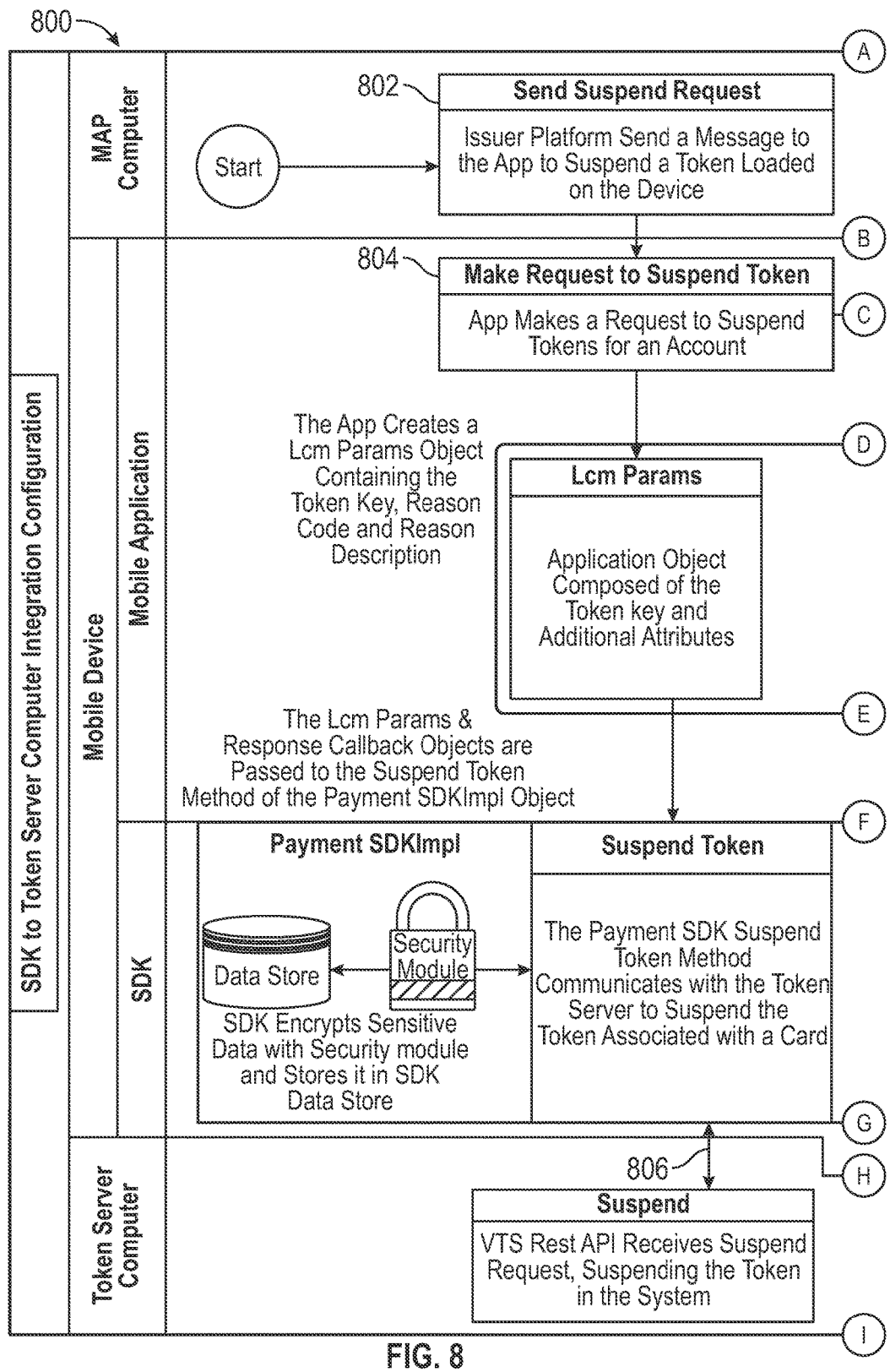
FIG. 8 shows a flow diagram of an exemplary suspend process for a system with the first exemplary integration configuration corresponding to the SDK to token server computer integration configuration illustrated in FIG. 4.
Figure 8:
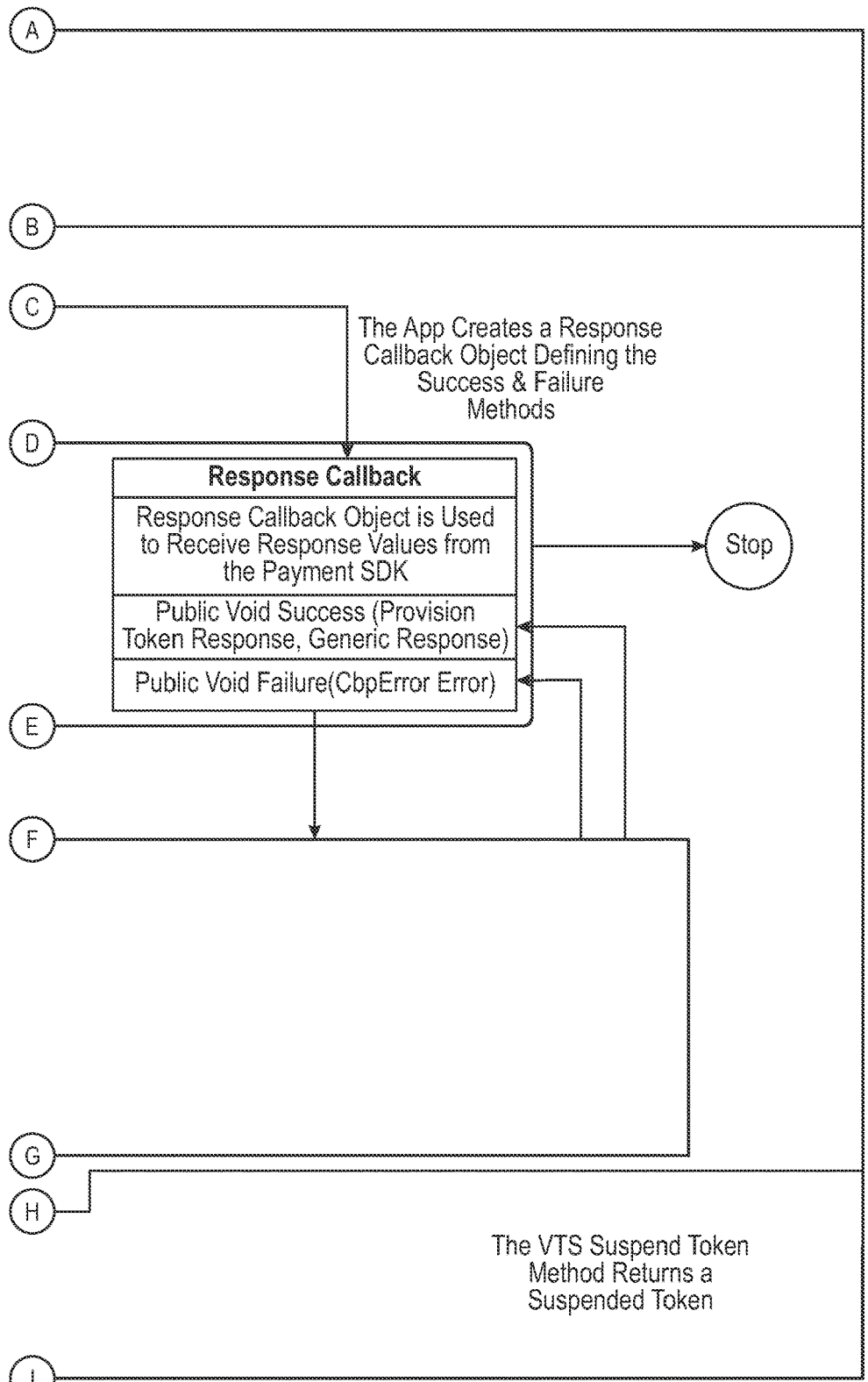

FIGS. 5-8 illustrate flow diagrams for various processes performed by the token SDK-to-token server computer integration system illustrated in FIG. 4. Specifically, FIG. 5 shows a flow diagram of an exemplary authentication process; FIG. 6 shows a flow diagram of an exemplary provisioning process; FIG. 7 shows a flow diagram of an exemplary dynamic parameter replenish process; and FIG. 8 shows a flow diagram of an exemplary suspend process of the system illustrated in FIG. 4. Each flow diagram is discussed next.

FIG. 5 shows a flow diagram of an exemplary authentication process 500 for a system with the first exemplary integration configuration corresponding to the token SDK-to-token server computer integration configuration. At step 502, the mobile application may create an instance of the token SDK that will encrypt sensitive data with security module and store it on the token SDK data store. The token SDK instance communicates with the token server computer to request an access token and conduct mobile device registration activities.

At step 504, the application authenticates the user upon the user providing their credentials (such as user name and password) to sign on to the application. At step 506, the application may request a JSON Web Token (JWT) that asserts the identity of the user from the MAP computer. The MAP computer may compile the JWT by populating the necessary authentication parameters and encoding them with the JSON Web Encryption (JWE) framework. The MAP computer may provide the generated JWT authentication token to the mobile application.

At step 508, the mobile application may create an authentication parameters object with the JWT authentication token. The authentication parameters object may be sent to the token SDK to obtain a token from the token server computer using the JWT authentication token. The mobile application may also create a response callback object defining success and failure methods, described above. The success and failure methods may be used by the token SDK to notify the mobile application whether a token is received from the token server computer.

The token server computer may receive the JWT via a token API and provides the access token to the token SDK via the token API. The token server computer may also receive the mobile device information via a device registration API and returns a conversation ID to the mobile device via the device registration API. The conversation ID may indicate that the communication is coming from an authenticated device. Authentication may return the access token and TTL for the access token. These are stored securely by the token SDK for subsequent use.

FIG. 6 shows a flow diagram of an exemplary provisioning process 600 for a system with the first exemplary integration configuration corresponding to the token SDK-to-token server computer integration configuration. As illustrated in FIG. 6, the token provisioning method may be called by the mobile application to retrieve and store token information for a particular account and/or channel. The token provisioning method provisions a token representing information associated with an account. A callback to the mobile application may indicate the successful handling of the token provisioning method and provide a token provisioning response which may contain the token key uniquely identifying the provisioned token to the mobile application. The mobile application may hold onto the token key in order to make subsequent calls that pertain to that stored token. These steps are discussed below.

At step 602, the mobile application may prompt the user to provide user data (such as payment information) that the user would like to reside on the mobile device. However, the user data are not stored on the mobile device as provided by the user. Specifically, the mobile application requests the MAP computer to encrypt the user data. At step 604, the user credentials are provided to the MAP computer for encryption. The MAP computer provides encrypted user data object to the mobile application.

At step 606, the mobile application may create a provision token parameters object containing the encrypted user data received from the MAP computer. The mobile application may also create a response callback object defining the success and failure methods. The response callback object may be used to receive response values from the token SDK. As provided above, when the token SDK receives a token from the token server computer, the token SDK does not provide the token to the mobile application. However, the token SDK may notify the mobile application whether a token is received (success) or not (failure).

At step 608, the token SDK may communicate with the token server computer to request tokenization of the encrypted user data (such as payment information). The token server computer may receive the encrypted user data, identify an account associated with the user data, create a token to represent the account, store the token, and send the token to the token SDK. The token SDK may utilize the token instead of the user data when needed. Upon receiving the token from the token server computer, the token SDK may store the token and notify the mobile application regarding the successful receipt of the token. In some embodiments, the token SDK may provide a token key identifying the token to the mobile application, at step 610.

FIG. 7 shows a flow diagram of an exemplary dynamic parameter replenish process 700 for a system with the first exemplary integration configuration corresponding to the token SDK-to-token server computer integration configuration. As illustrated in FIG. 7, the dynamic data replenishing method may be called by the token SDK to replenish the dynamic data for a provisioned token, for example by extending the duration of the limited use key (LUK). This method is available for the application to make a replenish request as needed. The token SDK may set the timers to track LUK time to live (TTL) through the mobile payment application (e.g., payWave™) component. Because the token SDK knows when a transaction occurs, the token SDK is able to track the number of transactions against a token issuer value of number of transactions risk threshold. Accordingly, it is not necessary for the mobile application to track or provide this information to the token SDK. To manage limited use key replenishment, the token SDK may provide two methods: a first method for checking periodically (e.g., each hour) whether a limited use key time to live threshold has expired and triggering a replenish intent when time to live (TTL) expires, and a second method for catching the replenish intent triggered by the first method.

At step 702, the mobile application may identify that the TTL of the token is nearing expiration and begins to compile objects needed to replenish token request. At step 704, the mobile application may create a replenish parameters object containing the encrypted user data. The replenish parameters object may also contain the token key identifying the token. The mobile application may also create a response callback object defining success and failure methods.

At step 706, the token SDK may retrieve the token identified by the token key and communicate with the token server computer to request replenishment of the dynamic parameters of the token. The token server computer may replenish the token LUK and associated TTL information. The token server computer may return the information to the token SDK which may, in turn, inform the mobile application that the replenish process was either a success or failure.

Further, in some embodiments, after every transaction attempt initiated by the user, using a given token, token SDK may check if the number of transactions threshold for replenishing LUK has been exceeded. When the number of transactions threshold increases, token SDK may initiate LUK replenishment.

Additionally, a status check method may be implemented which may be called by the token SDK to get the statuses of all the locally provisioned tokens. The status check method may check the status of all provisioned tokens for the mobile application. Subsequent actions can take place as a result of the statuses found. In some embodiments, the mobile application can call the status check method to check the status of tokens provisioned in the token SDK against the status of the same tokens in token server computer.

FIG. 8 shows a flow diagram of an exemplary suspend process 800 for a system with the first exemplary integration configuration corresponding to the token SDK-to-token server computer integration configuration. At step 802, the mobile application platform may send a message to the mobile application to suspend a token loaded on the mobile device.

At step 804, the mobile application may make a request to suspend the token(s) associated with an account. The mobile application may generate an application object including the token key identifying the token to be suspended. The mobile application may also generate a response callback object defining the success and failure methods. The mobile application may pass the application object and the response callback object to the token SDK.

At step 806, the token SDK may communicate with the token server computer to request the token server computer to suspend the token associated with the account. Upon receiving the request (message), the token server computer may suspend the token and returns a suspended token to the token SDK. The token SDK may store the suspended token and notify the mobile application.

As illustrated in FIG. 8, the suspend token process includes a lifecycle management call to suspend a token or multiple tokens. A call is made to the token server computer and when a successful response confirming token suspension is received, the state of the token is changed in token SDK data storage to the new state. Similar flows may be provided for the token resume method for activating a suspended token in the token server computer, followed by activation of the token on the user device, and the delete token method for deleting a token from the token server computer, followed by deletion from the user device.

II. Mobile Application Provider Computer-to-Token Server Computer Integration Option In some embodiments, the token SDK may be integrated with the mobile application and the token server computer via the mobile application provider (MAP) computer. The mobile application may use the token SDK primarily to initiate access to the token server computer in this kind of integration. However, the integration between the mobile application and token server computer is through the MAP computer. That is, the token SDK does not interact directly with token server computer.

Figure 9:
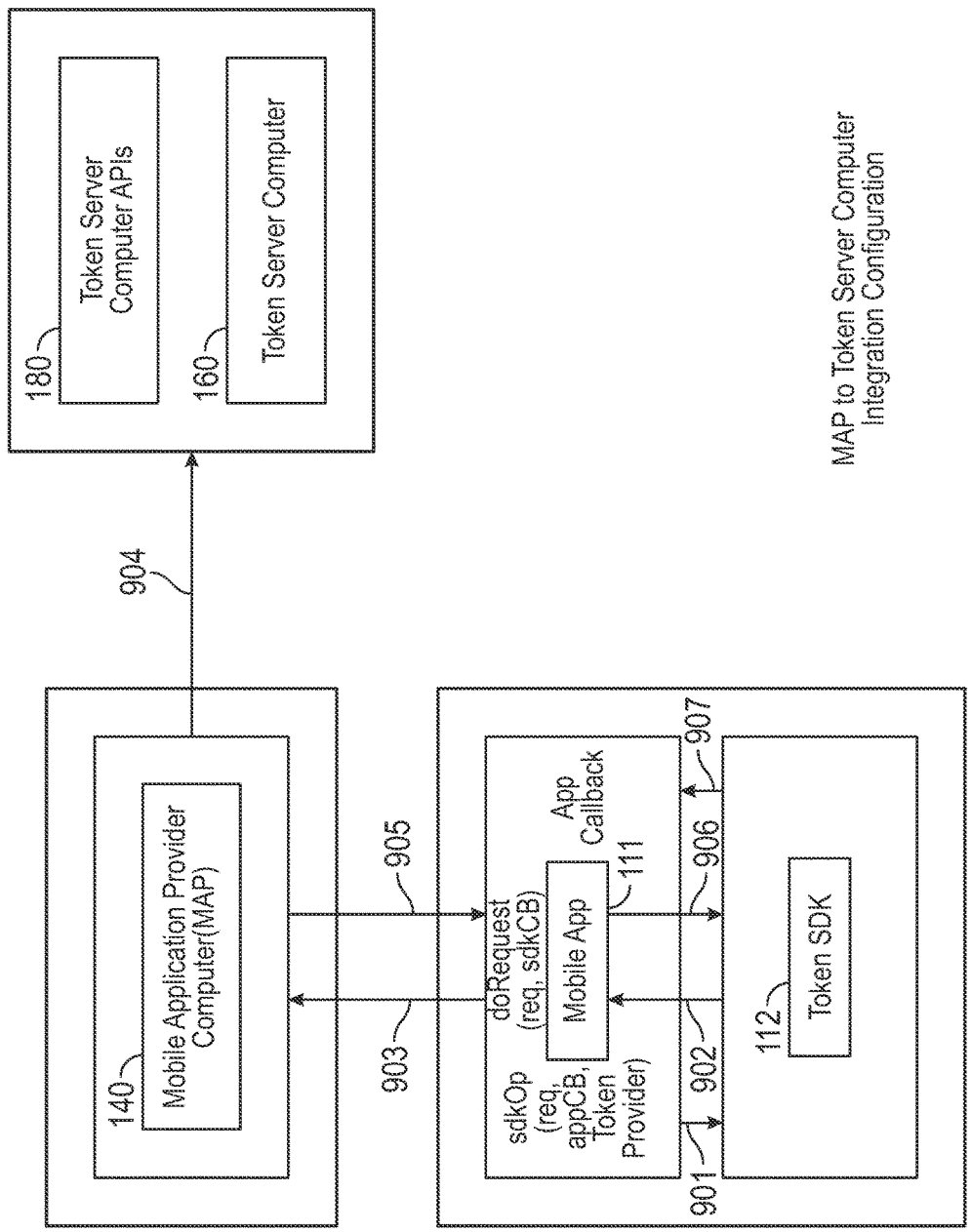
FIG. 9 shows a second exemplary integration configuration where the mobile application provider (MAP) computer directly communicates with the token server computer using token server computer APIs, according to an exemplary embodiment of the present invention.

FIG. 9 illustrates the MAP computer-to-token server computer integration where the mobile application 111 interacts with the token server computer 160 through the MAP computer 140.

As discussed above, the mobile application 111 may receive encrypted user data (e.g. encrypted payment data such as encrypted payment account number) from the MAP computer 140. The mobile application 111 may pass the encrypted user data to the token SDK 112 for obtaining a token representing the account associated with the encrypted user data. The mobile application 111 may request the token SDK 112 to obtain the token from the token server computer 160 by sending a token provisioning request message to the token SDK (step 901). The token SDK 112 may generate a token provisioning request message and send the message to the token server computer 160 via the MAP computer 140 (steps 902, 903 and 904).

This integration pattern may allow the application developer to connect with the token server computer through their application such as using the MAP computer. In some embodiments, to standardize the process for application developers, the token SDK may provide an interface called Token Provider to implement a variety of different methods.

The token provider may implement a token request method to reach out to token server computer 160 through its MAP computer 140. The token SDK 112 may call this method on the token provider object passed by the mobile application 111 in the provisioning request message (sent at step 901). Specifically, at step 901, the mobile application 111 may call a token SDK method, specifying a request, a callback to the mobile application, and an object that connects with a token provider, which typically represents a server on the MAP computer 140. The token provider object specifies a response to be populated and another callback, referred as the SDK callback, which may be used to call back to the token SDK 112 from the token request method.

At step 902, token SDK 112 may prepare the request and provide the request to the mobile application 111. Specifically, the token SDK 112 may call the token provider object's token request method, specifying the request parameters and a reference to the SDK callback.

At step 903, the mobile application 111 may provide the request to the MAP computer 140. That is, the token request method executes the actions specified by the mobile application 111 to connect with the MAP computer 140 and to obtain information (e.g. a token) from token server computer 160 at step 904. The MAP computer 140 may interact with the token server computer 160 through the token server computer APIs 180 to request and receive the token (step 904).

Once the MAP computer 140 receives a response from the token server computer 160, the MAP computer 140 may forward the received message to the mobile application 111 (step 905). The mobile application may convert the response to a format that may be read and used by the token SDK 112. For example, the response may originally be received in a JSON format and may be converted to a Java object format specified by the token SDK 112. At step 906, the mobile application 111 may forward the formatted response from the token server computer 160 to the token SDK 112.

At step 906, the mobile application 111 may populate the response object (specified in the token provider's callback) with the response received from MAP computer 140. The mobile application returns the response object to the token request method. The mobile application 111 calls a success method or a failure method on the providers callback and passes the response object in these methods. The mobile application 111 may do this from within token request method.

There may be at least two callbacks implemented by the mobile application 111. One callback may be for the mobile application 111 to notify the token SDK 112 of success or failure of the token request method discussed above. When the mobile application 111 gets a success response to its request to the MAP computer 140 (e.g. the token request method), then the mobile application 111 may provide the response object containing data to be stored in token SDK 112 (step 906). If the token request method fails, then application calls failure function on the callback. Additionally, when the mobile application 111 has notified token SDK 112 of success or failure of the request made to MAP computer 140, token SDK 112 may then call the second callback to let the mobile application 111 know of success/failure of the provisioning request (step 907). Specifically, the token SDK 112 callback may call the mobile application callback's success method or failure method to return the response to the mobile application 111. The mobile application's callback is the standard callback the mobile application 111 specified when making the request in step 901.

In this second exemplary integration configuration, the mobile application 111 communicates with the MAP computer 140 (step 903), and the MAP computer 140 handles the interaction with token server computer 160 (step 904). The MAP computer 140 then provides the response data, received from token server computer 160, to the mobile application 111 (step 905). The mobile application 111 provides the response from the MAP computer 140 to the token SDK 112 (step 906). Similar to the first exemplary integration configuration, the token SDK 112 provides the result (indicating whether the token is successfully provisioned) to the mobile application 111 using a callback (step 907).

Figure 10:
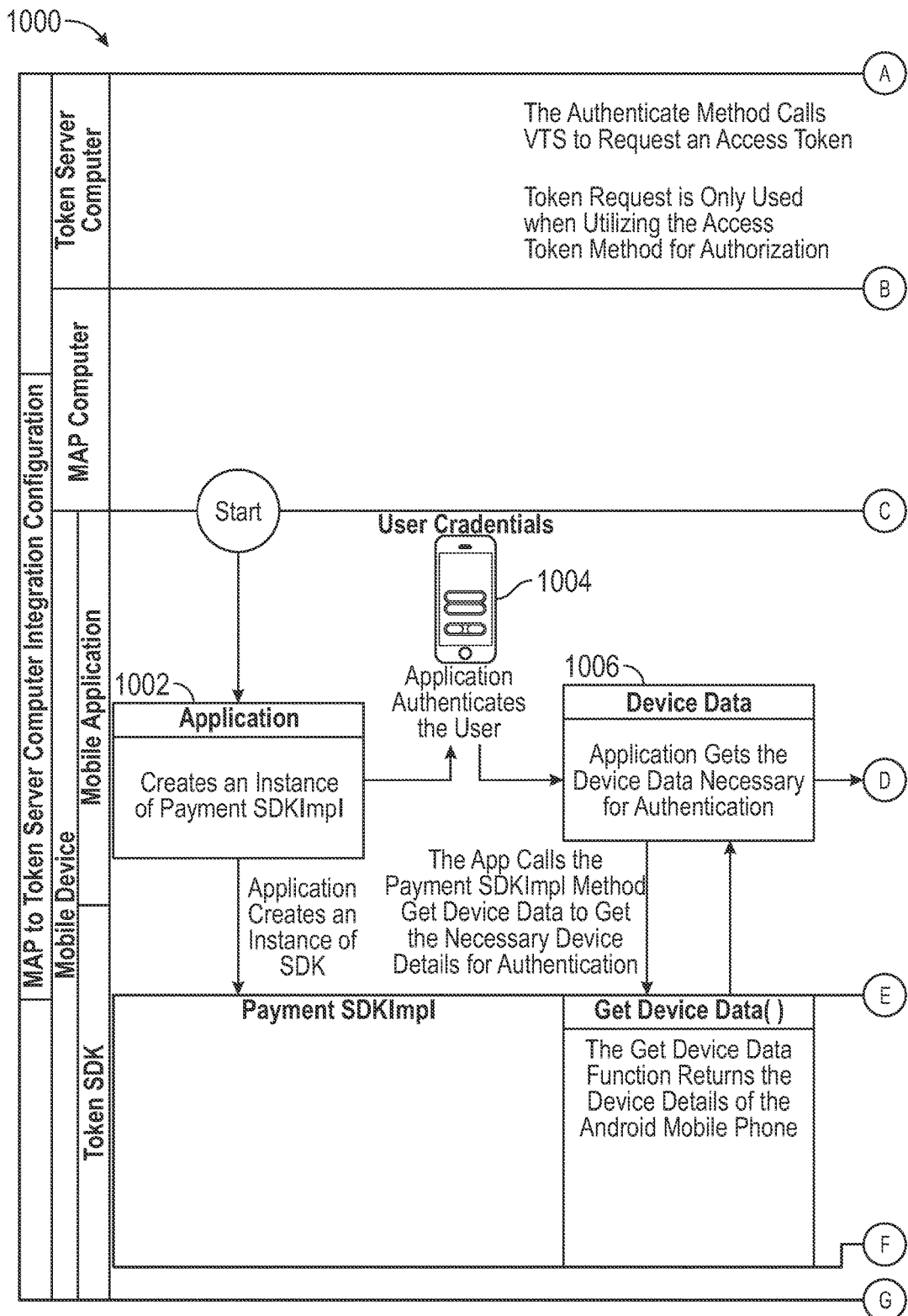
FIG. 10 shows a flow diagram of an exemplary authentication process for a system with the second exemplary integration configuration corresponding to the MAP computer to token server computer integration configuration illustrated in FIG. 9.
Figure 10:
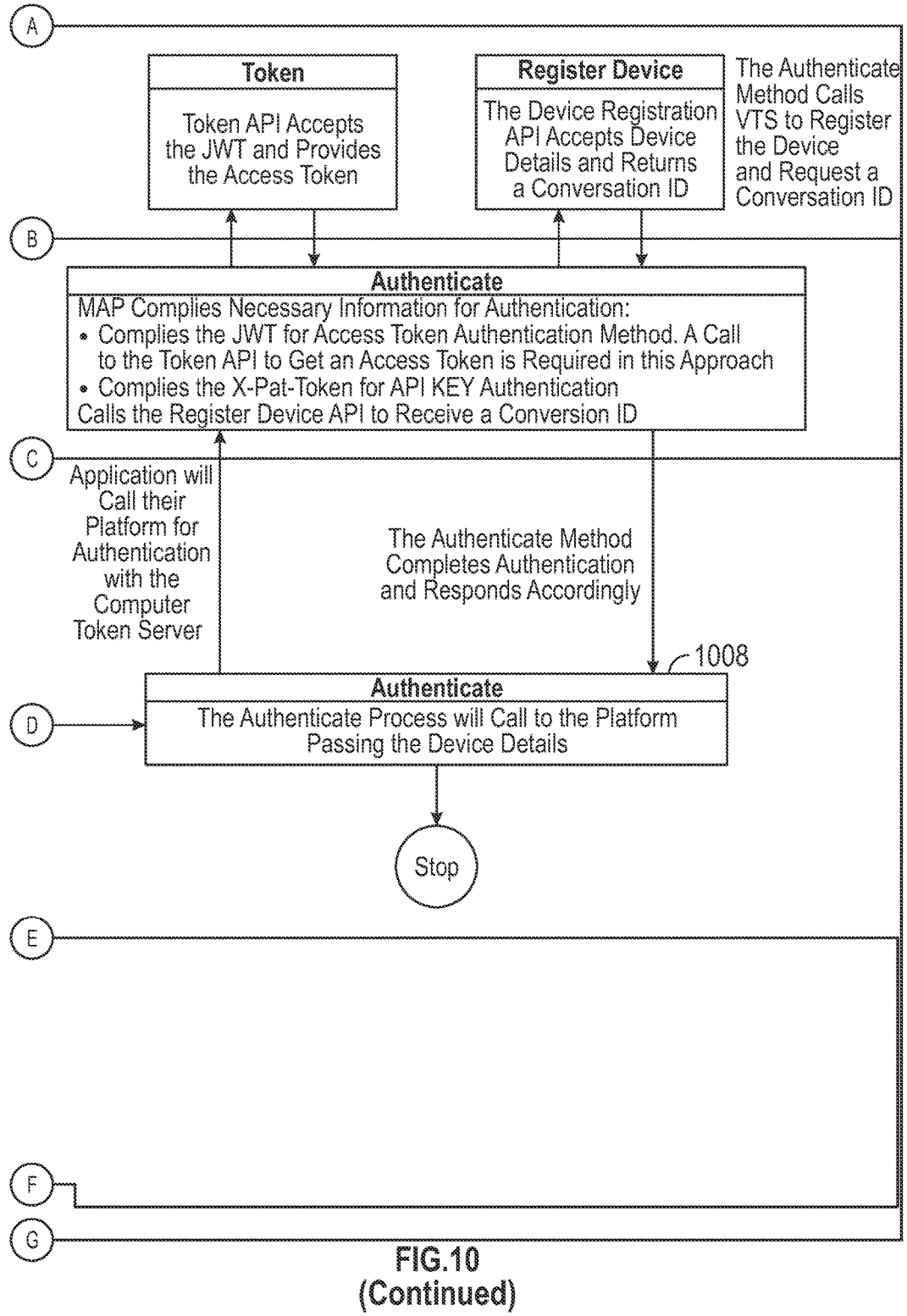
Figure 11:
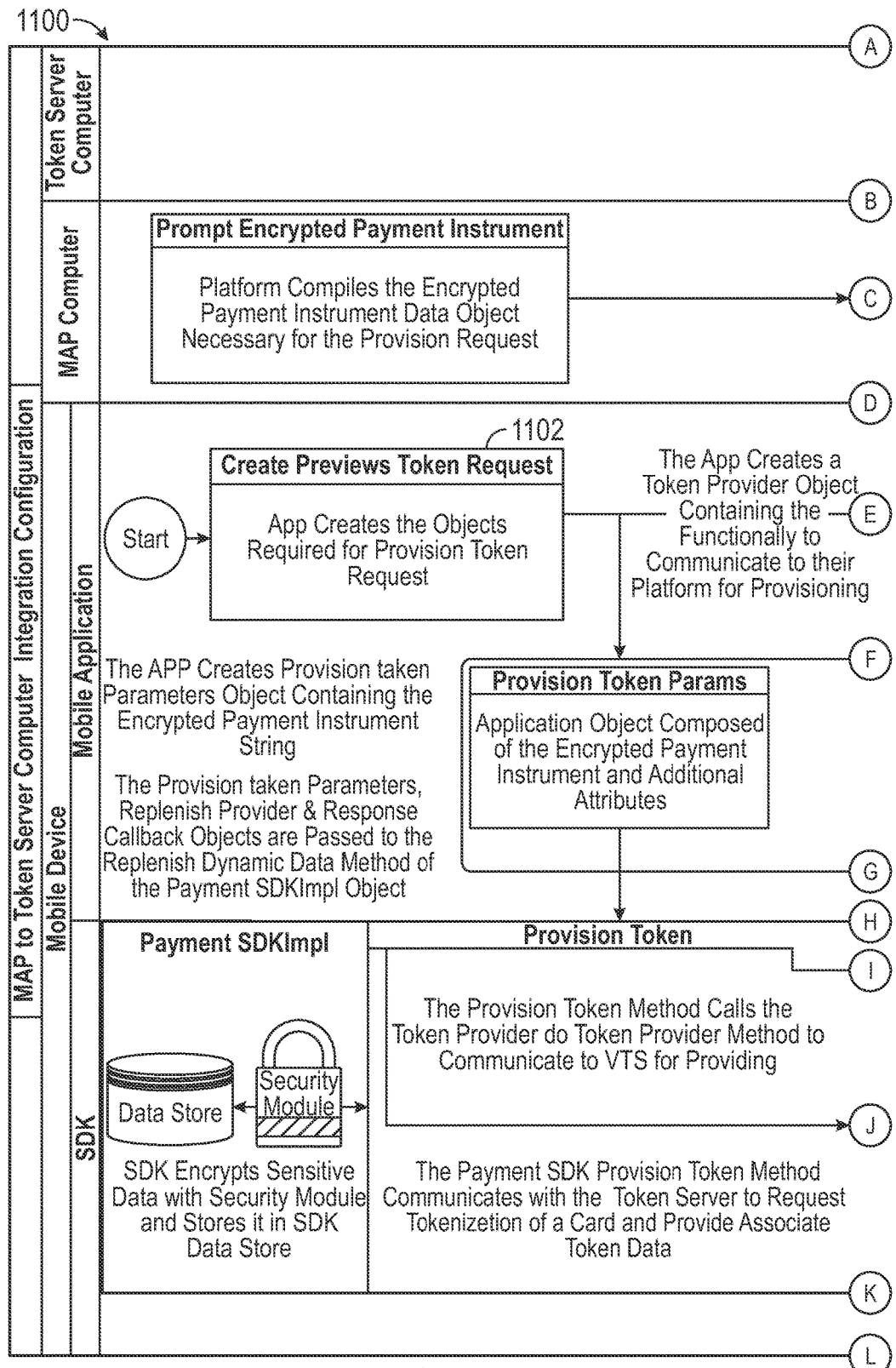
FIG. 11 shows a flow diagram of an exemplary provisioning process for a system with the second exemplary integration configuration corresponding to the MAP computer to token server computer integration configuration illustrated in FIG. 9.
Figure 11:
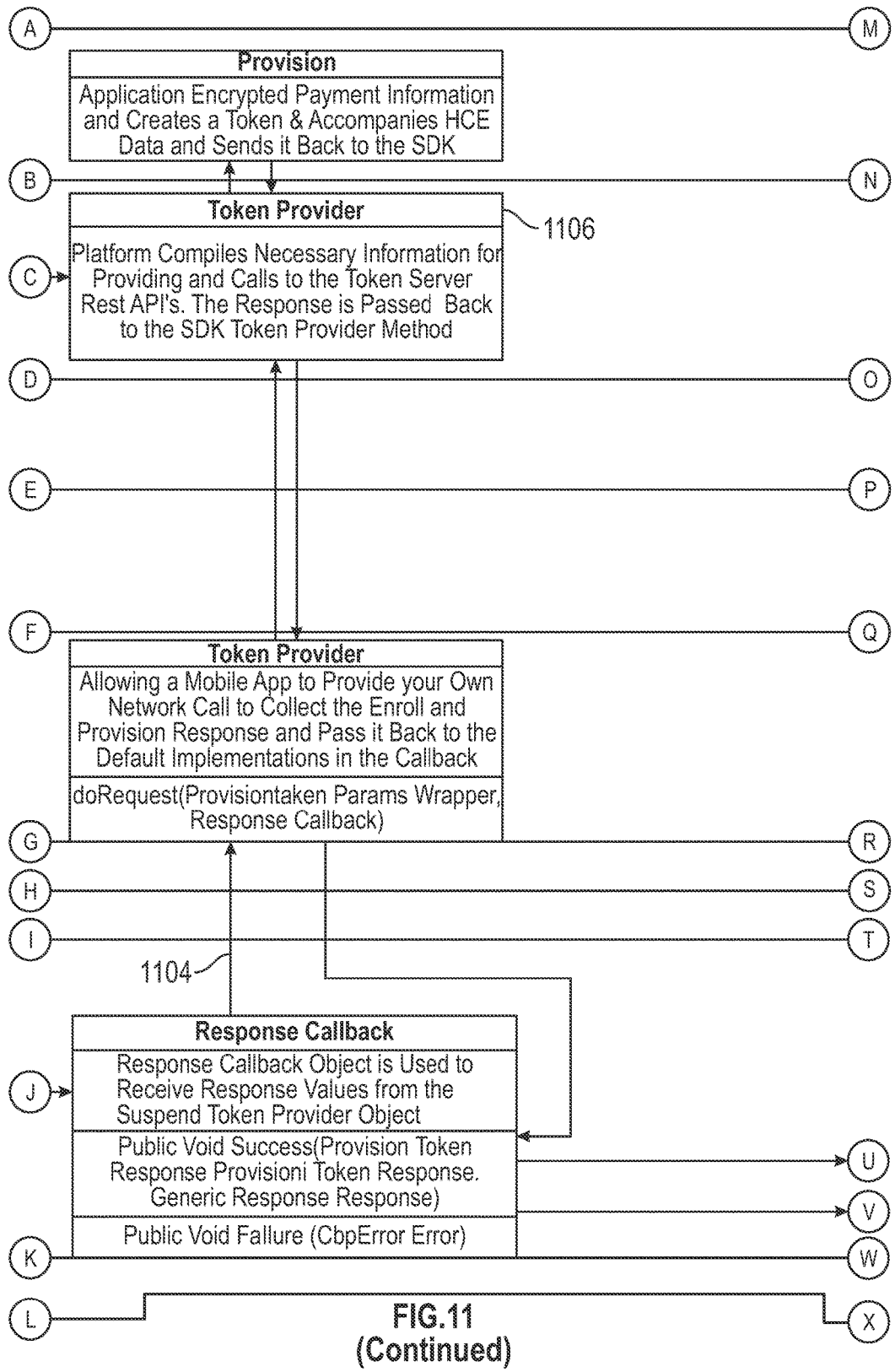
Figure 11:
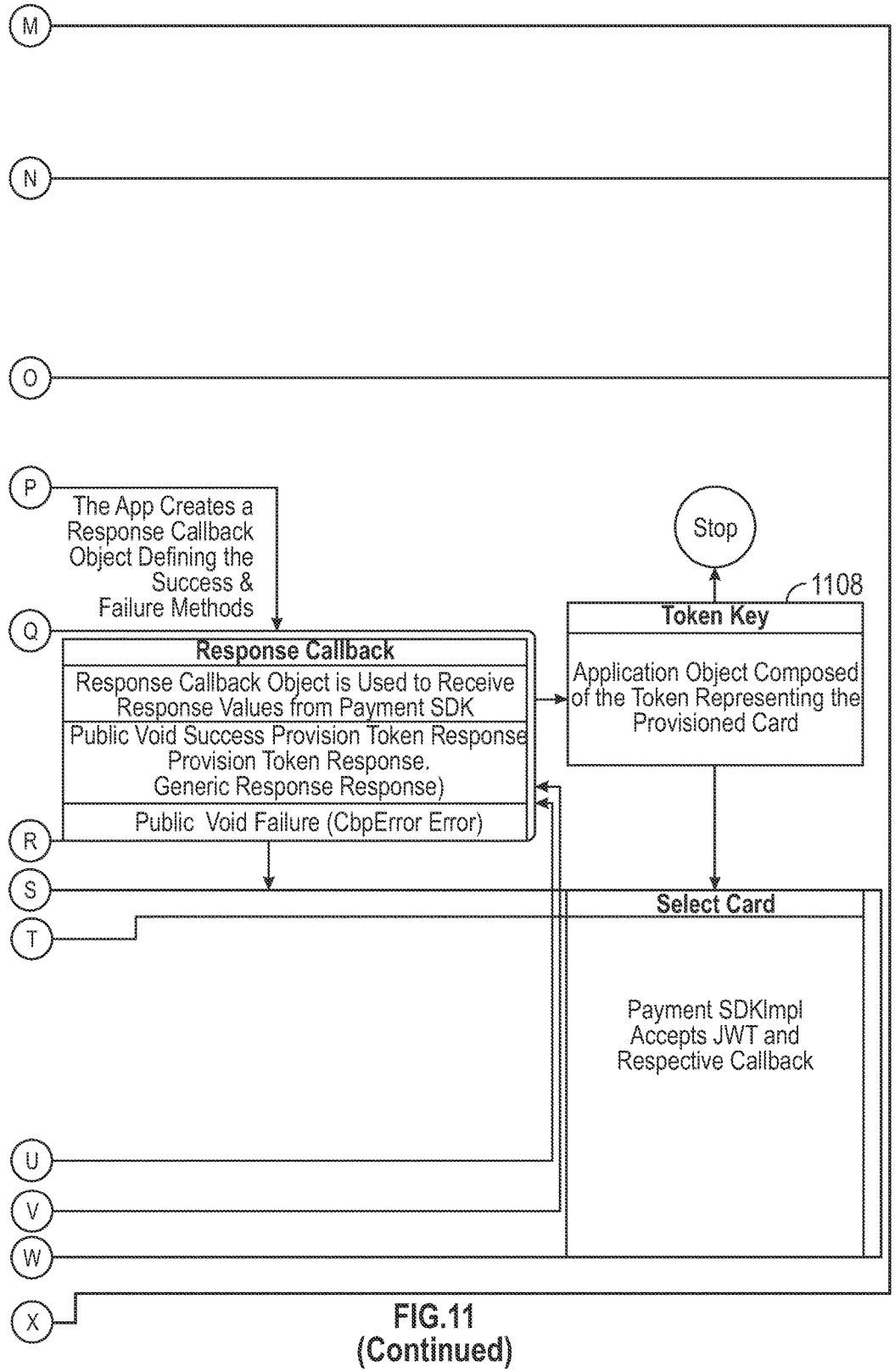
Figure 12:
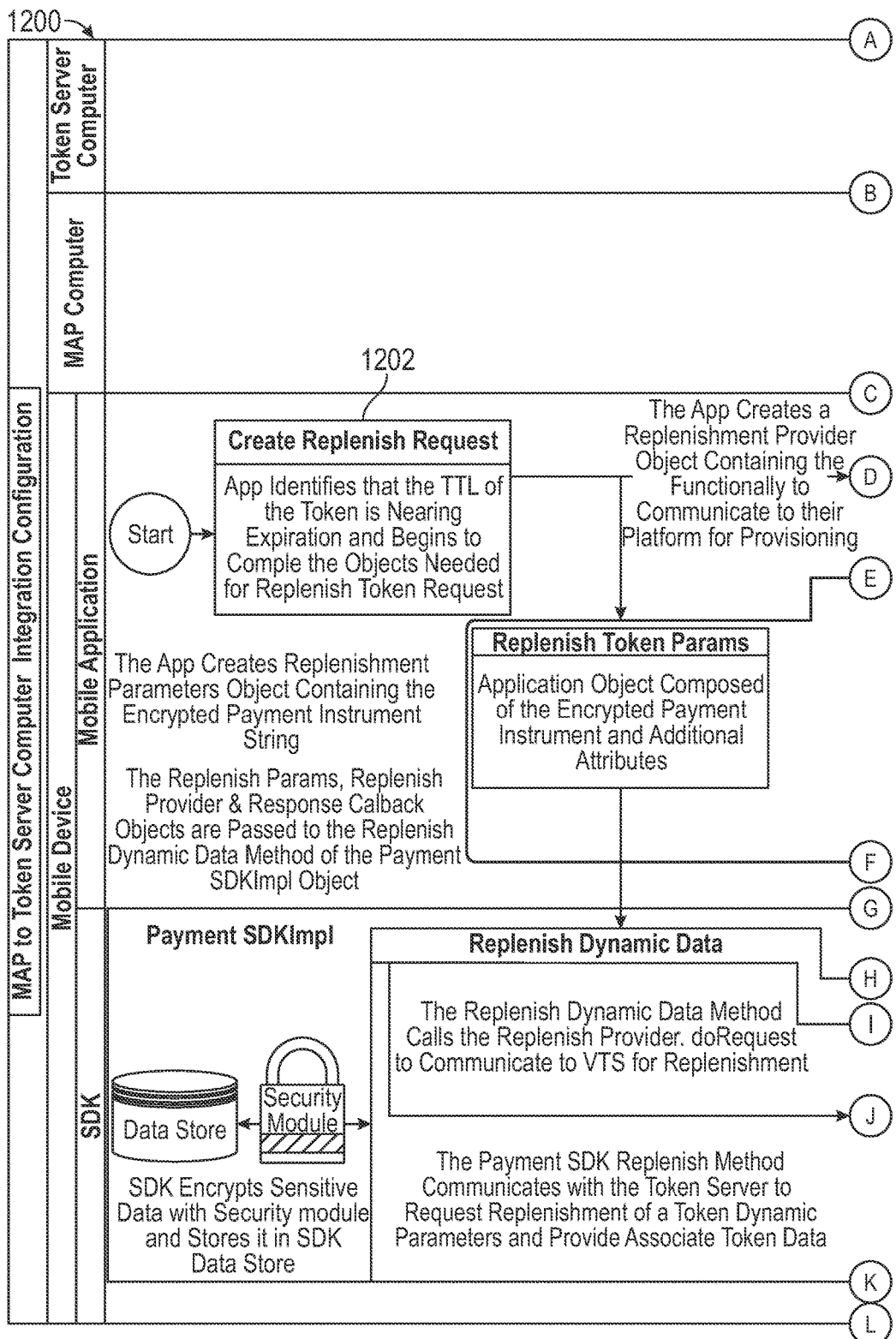
FIG. 12 shows a flow diagram of an exemplary dynamic parameter replenish process for a system with the second exemplary integration configuration corresponding to the MAP computer to token server computer integration configuration illustrated in FIG. 9.
Figure 12:
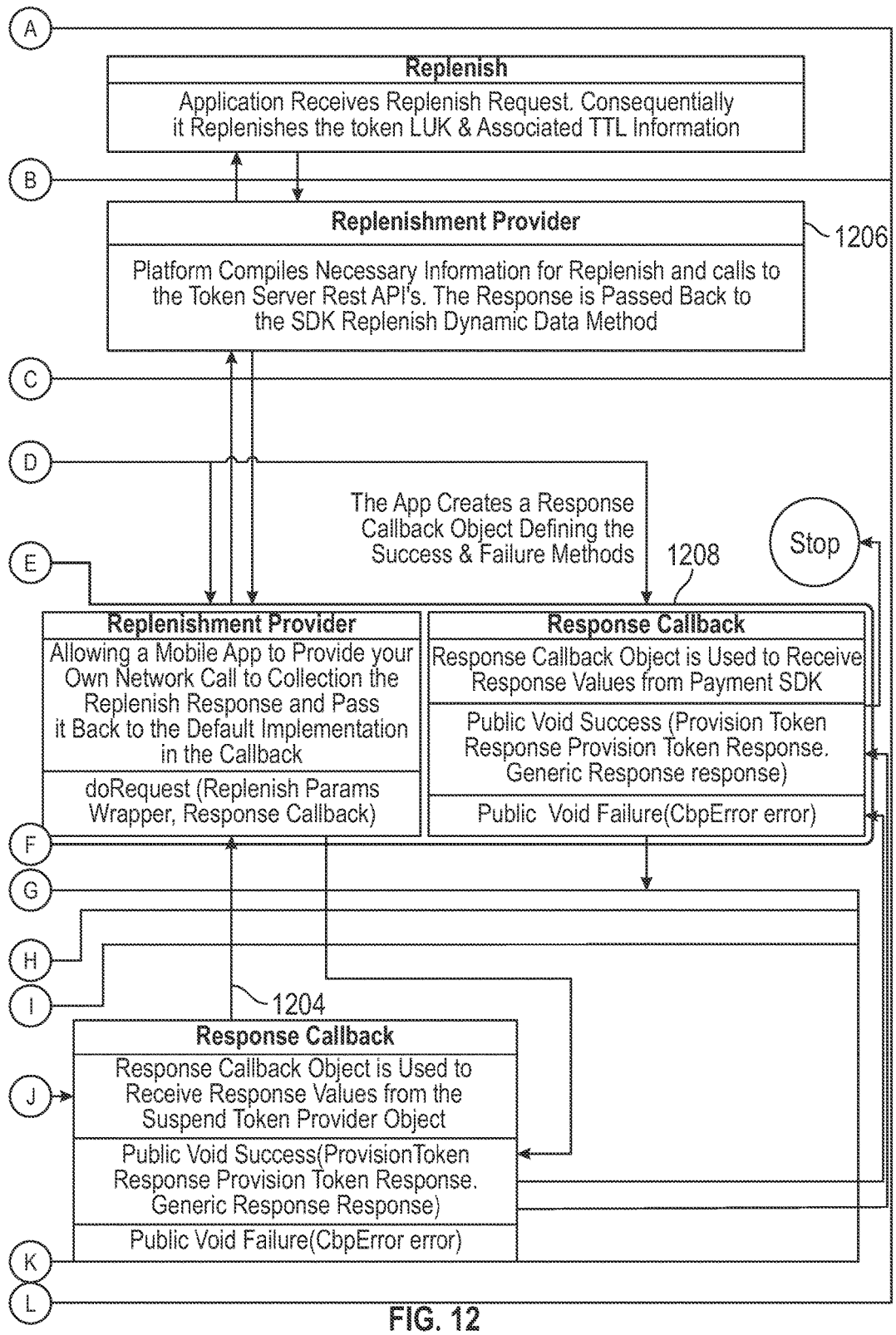
Figure 13:
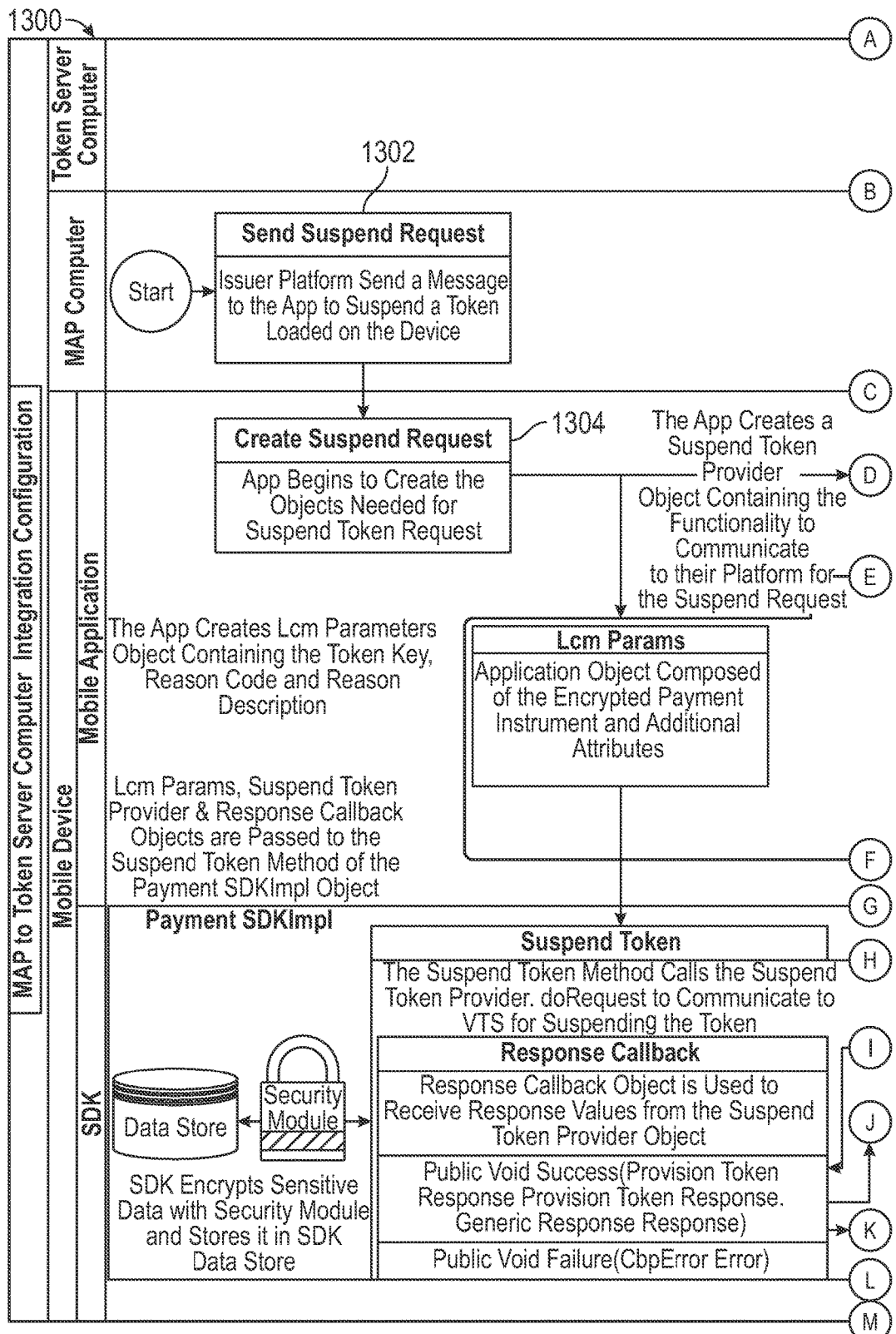
FIG. 13 shows a flow diagram of an exemplary suspend process for a system with the second exemplary integration configuration corresponding to the MAP computer to token server computer integration configuration illustrated in FIG. 9.
Figure 13:
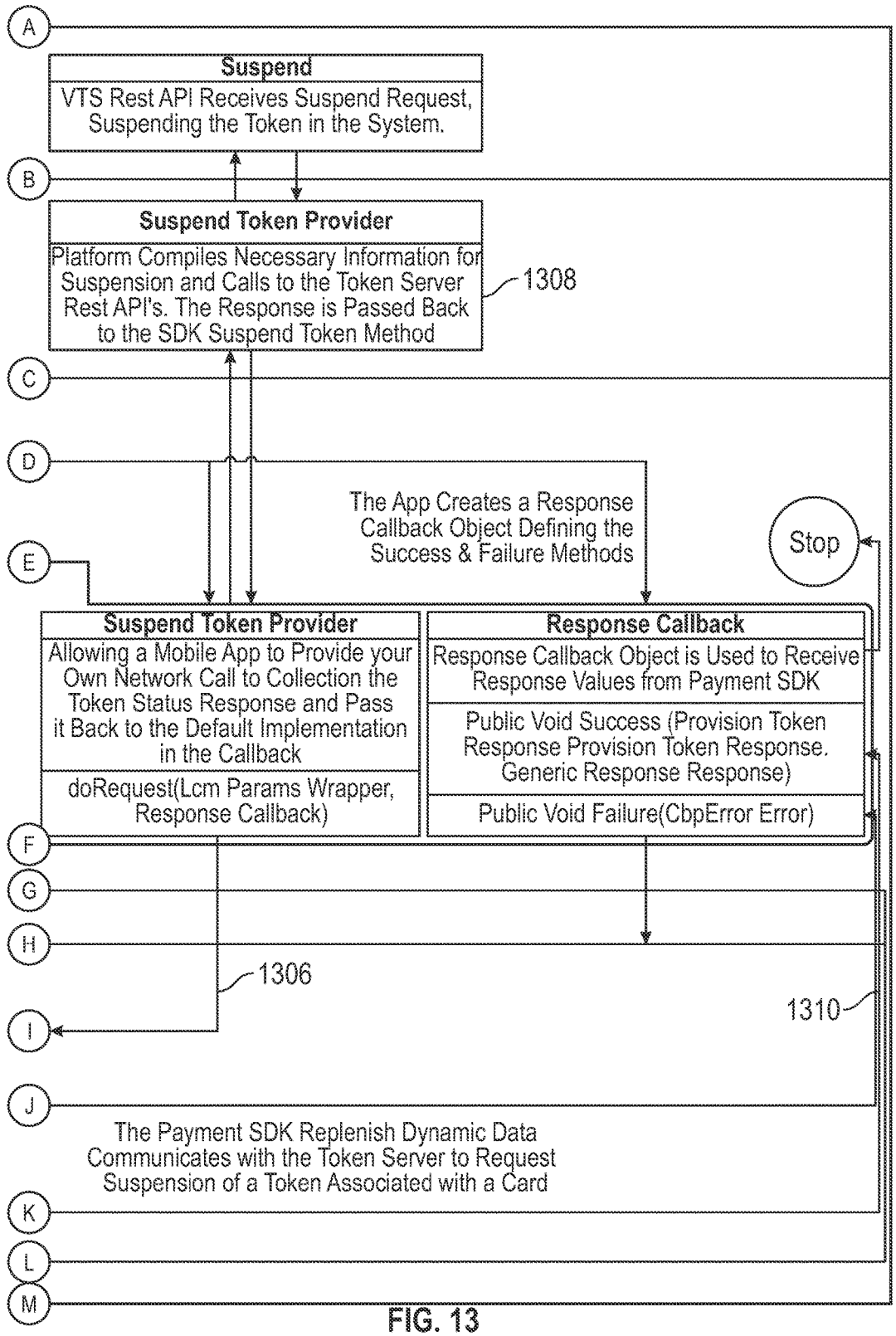

FIGS. 10-13 illustrate flow diagrams for various processes performed by the MAP computer-to-token server computer integration system illustrated in FIG. 9. Specifically, FIG. 10 shows a flow diagram of an exemplary authentication process; FIG. 11 shows a flow diagram of an exemplary provisioning process; FIG. 12 shows a flow diagram of an exemplary dynamic parameter replenish process; and FIG. 13 shows a flow diagram of an exemplary suspend process of the system illustrated in FIG. 9. Each flow diagram is discussed next.

FIG. 10 shows a flow diagram of an exemplary authentication process 1000 for a system with the second exemplary integration configuration corresponding to the MAP computer-to-token server computer integration configuration. At step 1002, the mobile application may create an instance of the token SDK that will encrypt sensitive data with security module and store it on the token SDK data store.

At step 1004, the mobile application authenticates the user upon the user providing their credentials (such as user name and password) to sign on to the application. At step 1006, the mobile application receives the device data necessary for authentication from the token SDK. The mobile application then calls the MAP computer for authentication with the token server computer. The MAP computer may compile the necessary information for authentication. For example, the MAP computer may compile the JWT for access token authentication method. A call to the token API to get an access token may be required. The token server computer may accept the JWT and provide the access token. The token server computer may also register the device and return a conversation ID in response to the device details.

At step 1008, the mobile application may receive an indication that the authentication is complete.

FIG. 11 shows a flow diagram of an exemplary provisioning process 1100 for a system with the second exemplary integration configuration corresponding to the MAP computer-to-token server computer integration configuration. At step 1102, the mobile application may create the objects needed for the token provisioning request (e.g. the token provisioning method). The mobile application may create a provision token parameters object containing the encrypted user data. The mobile application also creates a token provider object containing the functionality to communicate with the MAP computer for token provisioning. The mobile application may also create a response callback object defining the success and failure methods. The mobile application may pass the provision token parameters, token provider and response callback objects to the token provisioning method. As illustrated in FIG. 11, the token provisioning method may be called by the mobile application to retrieve and store token information for a particular account and/or channel.

At step 1104, the token provisioning method may call a token SDK method to communicate with the token server computer to request tokenization of the encrypted user information. This call may be passed to the MAP computer at step 1106. This call may allow the MAP computer to implement the token provider method, allowing the MAP computer to implement their own network call to collect the token. Specifically, the MAP computer may interact with the token server computer. The token server computer may receive the encrypted user data, identify an account associated with the encrypted user data, generate a token representing the account, store the token and send the token to the MAP computer. The MAP computer may pass the token to the token SDK in the callback. The token SDK 112 may then store the token.

At step 1108, the outer callback may then return success to the mobile application, handing back a response to the token provisioning request which may contain a token key uniquely identifying the provisioned token. The mobile application may hold onto the token key in order to make subsequent calls that pertain to the associated token. The mobile application does not have access to the token itself.

In this integration model, the mobile application does not need to provide user data (e.g. payment account information such as a PAN or a PAN reference identifier). The MAP computer provides the token data from the token server computer in response to the provision request made by the MAP computer. The MAP computer provides the token to the token SDK through the inner callback.

FIG. 12 shows a flow diagram of an exemplary dynamic parameter replenish process 1200 for a system with the second exemplary integration configuration corresponding to the MAP computer-to-token server computer integration configuration. The dynamic data replenishing method may be called by the mobile application with a custom replenishment provider (e.g., a network caller) to replenish the dynamic data for a token. For example, the token SDK may provide two methods to manage limited use key replenishment: a first method for checking periodically (e.g., each hour) whether a limited use key time to live threshold has expired and triggering a replenish intent when time to live (TTL) expires, and a second method for catching the replenish intent triggered by the first method.

At step 1202, the mobile application may identify that the TTL of the token is nearing expiration and begins to compile objects needed to replenish token request. The mobile application may create a replenish parameters object containing the encrypted user data. The replenish parameters object may also contain the token key identifying the token. The mobile application also creates a replenishment provider object containing the functionality to communicate with the MAP computer for token replenishment. The mobile application may also create a response callback object defining success and failure methods. The mobile application may pass the replenish parameters, replenish provider and response callback objects to a dynamic data replenishing method.

At step 1204, the dynamic data replenishing method may call a token SDK method to communicate with the token server computer to request replenishment of dynamic token parameters and provide the associated token data. This call may be passed to the MAP computer at step 1206. This call may allow the MAP computer to implement the Replenishment Provider method, allowing the MAP computer to implement their own network call to collect the token replenish response. Specifically, the MAP computer may interact with the token server computer. The token server computer may receive the replenish request, replenishes the token LUK and associated TTL information. The MAP computer may pass the replenished token LUK and associated TTL information to the token SDK 112 in the callback. The token SDK 112 may then store the information.

At step 1208, the outer callback may then return success to the mobile application, handing back a response to the token provisioning request which may contain a token key uniquely identifying the provisioned token. The mobile application may hold onto the token key in order to make subsequent calls that pertain to the associated token. The mobile application does not have access to the token itself.

FIG. 13 shows a flow diagram of an exemplary suspend process 1300 a system with the second exemplary integration configuration corresponding to the MAP computer-to-token server computer integration configuration. At step 1302, the mobile application platform may send a message to the mobile application to suspend a token loaded on the mobile device.

At step 1304, the mobile application may make a request to suspend the token(s) associated with an account. The mobile application may generate a parameters application object including the token key identifying the token to be suspended and, if applicable, a reason code indicating why the token should be suspended along with a description of the reason. The mobile application also creates a suspend token object containing the functionality to communicate with the MAP computer for the suspend request. The mobile application may also create a response callback object defining success and failure methods. The mobile application may pass the parameters, suspend token provider and response callback objects to a token suspending method.

At step 1306, the token suspending method may call a token SDK method to communicate with the token server computer to request suspending the token. The token suspending method may suspend a token in the token server computer, followed by suspension of the token on the user device. The call to the token SDK may be passed to the MAP computer at step 1308. This call may allow the MAP computer to implement their own network call to collect the token status response. Specifically, the MAP computer may interact with the token server computer. The token server computer may receive the suspend token request, suspends the token and sends an updated token status (i.e. suspended) to the MAP computer. The MAP computer may pass the updated token status to the token SDK 112 in the callback. The token SDK 112 may then store the token status in token memory.

At step 1310, the outer callback may then return success to the mobile application.

The token suspending method illustrated in FIG. 13 may include a lifecycle management call to suspend a token or to suspend multiple tokens. A call may be made to the token server computer and when a successful response confirming token suspension is received, the state of the token may be changed in the token SDK data storage. In some embodiments, one token can be suspended at a time.

Exemplary Computer System

Figure 14:
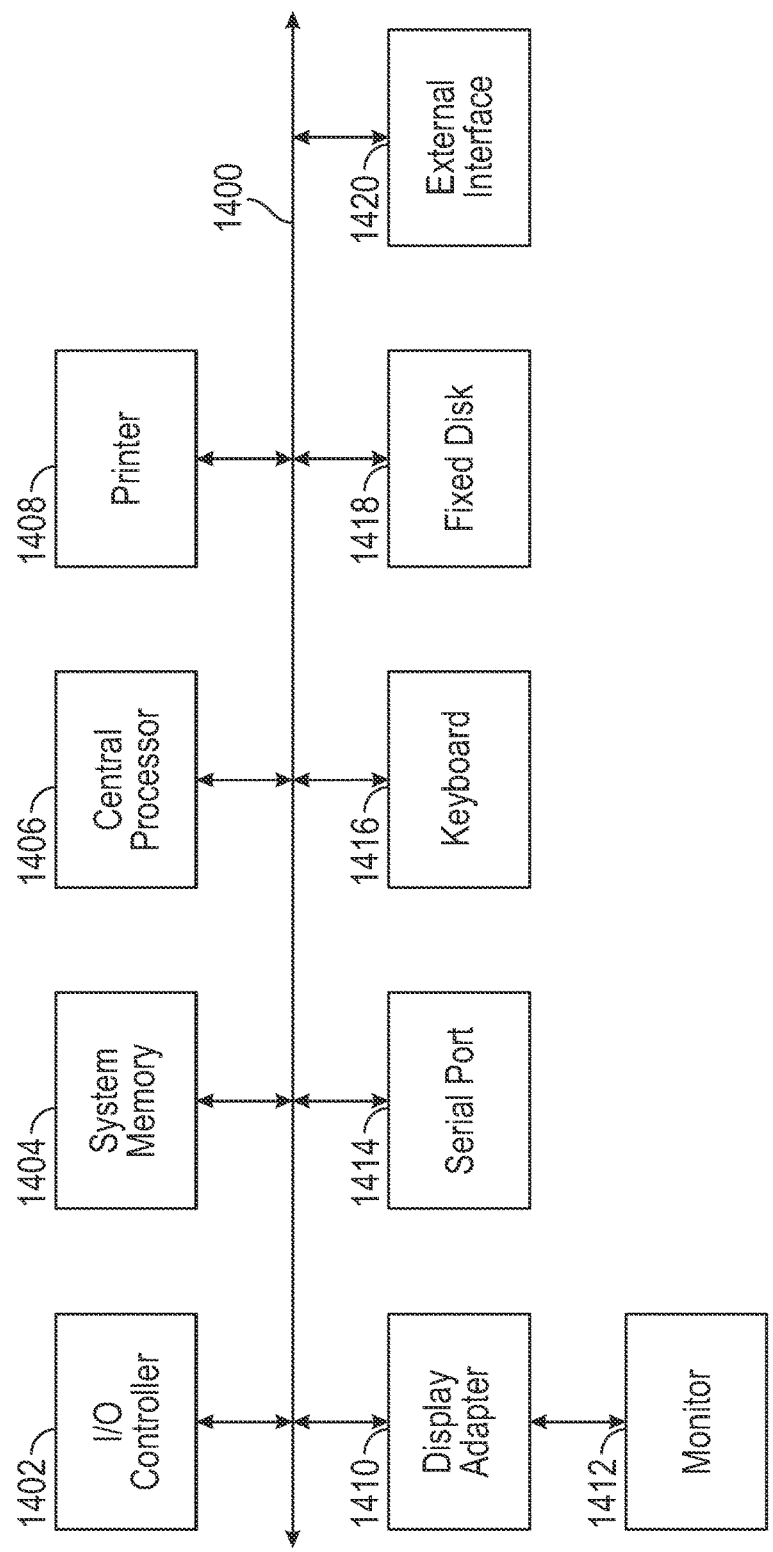
FIG. 14 shows a block diagram showing components in a computer system.

The various participants and elements shown in FIGS. 1A-1B may operate one or more computer apparatuses (e.g., a server computer) to facilitate the functions described herein. Any of the elements in FIG. 1A-1B may use any suitable number of subsystems to facilitate the functions described herein. Examples of such subsystems or components are shown in FIG. 14. The subsystems such as a printer 1408, keyboard 1416, fixed disk 1418 (or other memory comprising computer readable media), monitor 1412, which is coupled to a display adapter 1410, and others are shown. Peripherals and input/output (I/O) devices, which couple to I/O controller 1402, can be connected to the computer system by any number of means known in the art, such as serial port 1414. For example, serial port 1414 or external interface 1420 can be used to connect the computer apparatus to a wide area network such as the Internet, a mouse input device, or a scanner. The interconnection via system bus allows the central processor 1406 to communicate with each subsystem and to control the execution of instructions from system memory 1404 or the fixed disk 1418, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a mobile application provided on a mobile device from a user of the mobile device, an account identifier associated with an account of the user; and
   providing, by the mobile application to a remote mobile application server, the account identifier without storing the account identifier on the mobile device;
   receiving, by the mobile application from the remote mobile application server, encrypted account identifier associated with the account of the user, wherein the encrypted account identifier is encrypted by the remote mobile application server using an encryption key shared between the remote mobile application server and a token server computer external to the mobile device;
   generating, by the mobile application, a token request message, the token request message including the encrypted account identifier;
   sending, by the mobile application, the token request message to the token server computer via a token module provided on the mobile device, wherein the token server computer decrypts the encrypted account identifier using the encryption key previously shared with the remote mobile application server, identifies the account associated with decrypted account identifier, generates a token associated with the account, stores the token, and sends the token to the token module provided on the mobile device, wherein the token module interfaces with the token server computer external to the mobile device;
   receiving, by the token module stored on mobile device, the token associated with the encrypted account identifier from the token server computer;
   storing, by the token module, the token in a secure token memory of the mobile device accessible by the token module;
   determining, by the token module, a token key associated with the stored token,
   providing, by the token module, the token key to the mobile application for use as a token reference identifier for the token;
   upon receiving the token key, initiating, by the mobile application, a transaction with a transacting entity using the token key; and
   transmitting, by the token module, the token to the transacting entity to proceed with the transaction.

2. The method of claim 1, further comprising:
   requesting, by the mobile device, a status of the token;
   receiving, by the mobile device, a token status response from the token server computer; and
   storing, by the mobile device, the status associated with the token in the token memory.

3. The method of claim 1, wherein the encryption key and the account identifier associated with the account of the user of the mobile device are stored by the remote mobile application server.

4. The method of claim 1, wherein the token memory is managed by the token module provided on the mobile device, the token module being associated with the token server computer such that the mobile device interfaces with the token server computer via the token module.

5. The method of claim 4, wherein the token module interfaces with an Application Programming Interface (API) of the token server computer.

6. A mobile device comprising:
   a processor; and
   a memory element comprising code, executable by the processor, for implementing a method comprising:
      receiving, by a mobile application provided on the mobile device from a user of the mobile device, an account identifier associated with an account of the user; and
      providing, by the mobile application to a remote mobile application server, the account identifier without storing the account identifier on the mobile device;
      receiving, by the mobile application from the remote mobile application server, encrypted account identifier associated with the account of the user, wherein the encrypted account identifier is encrypted by the remote mobile application server using an encryption key shared between the remote mobile application server and a token server computer external to the mobile device;
      generating, by the mobile application, a token request message, the token request message including the encrypted account identifier;
      sending, by the mobile application, the token request message to the token server computer via a token module provided on the mobile device, wherein the token server computer decrypts the encrypted account identifier using the encryption key previously shared with the remote mobile application server, identifies the account associated with decrypted account identifier, generates a token associated with the account, stores the token, and sends the token to the token module provided on the mobile device, wherein the token module interfaces with the token server computer external to the mobile device;

receiving, by the token module stored on mobile device, the token associated with the encrypted account identifier from the token server computer;

storing, by the token module, the token in a secure token memory of the mobile device accessible by the token module;

determining, by the token module, a token key associated with the stored token, providing, by the token module, the token key to the mobile application for use as a token reference identifier for the token;

upon receiving the token key, initiating, by the mobile application, a transaction with a transacting entity using the token key; and transmitting, by the token module, the token to the transacting entity to proceed with the transaction.

7. The mobile device of claim 6, wherein the method further comprises:

requesting, by the mobile device, a status of the token;

receiving, by the mobile device, a token status response from the token server computer; and storing, by the mobile device, the status associated with the token in the token memory.

8. The mobile device of claim 6, wherein the token memory is managed by the token module provided on the mobile device, the token module being associated with the token server computer such that the mobile device interfaces with the token server computer via the token module.

9. The mobile device of claim 8, wherein the token module interfaces with an Application Programming Interface (API) of the token server computer.

* * * * *